US008743837B2

(12) United States Patent
van Zelst et al.

(10) Patent No.: US 8,743,837 B2
(45) Date of Patent: Jun. 3, 2014

(54) MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES

(75) Inventors: Albert van Zelst, Woerden (NL); D. J. Richard van Nee, De Meern (NL); Vincent K. Jones, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 367 days.

(21) Appl. No.: 12/552,705

(22) Filed: Sep. 2, 2009

(65) Prior Publication Data

US 2010/0061402 A1     Mar. 11, 2010

Related U.S. Application Data

(63) Continuation of application No. 11/140,349, filed on May 27, 2005, now Pat. No. 7,599,332, which is a continuation-in-part of application No. 10/820,440, filed on Apr. 5, 2004, now Pat. No. 7,916,803.

(60) Provisional application No. 60/575,608, filed on May 27, 2004.

(51) Int. Cl.
*H04Q 7/00*     (2006.01)

(52) U.S. Cl.
USPC ............ 370/334; 370/350; 370/206; 375/316

(58) Field of Classification Search
USPC ........................... 370/334, 206, 350; 375/316
See application file for complete search history.

(56) References Cited

U.S. PATENT DOCUMENTS 5,131,006 A    7/1992  Kamerman et al.
5,553,064 A    9/1996  Paff et al.
(Continued)

FOREIGN PATENT DOCUMENTS

EP    0646992 A1    4/1995
EP     648032 A1    4/1995
(Continued)

OTHER PUBLICATIONS

James Gardner et at., Non-Final Office Action, U.S. Appl. No. 10/820,440, US-Nov. 28, 2008.

(Continued)

*Primary Examiner* — Danh Le
(74) *Attorney, Agent, or Firm* — Eric Ho

(57) ABSTRACT

A modified preamble is used by extended devices that operate at higher rates, MIMO or other extensions relative to strict 802.11a-compliant devices. The extended devices might use multiple antenna techniques (MIMO), where multiple data streams are multiplexed spatially and/or multi-channel techniques, where an extended transmitter transmits using more than one 802.11a channel at a time. Such extensions to IEEE 802.11a can exist in extended devices. The modified preamble is usable for signaling, to legacy devices as well as extended devices, to indicate capabilities and to cause legacy devices or extended devices to defer to other devices such that the common communication channel is not subject to unnecessary interference. The modified preamble is also usable for obtaining MIMO channel estimates and/or multi-channel estimates. The modified preamble preferably includes properties that facilitate detection of conventional and/or extended modes ("mode detection") and provides some level of coexistence with legacy IEEE 802.11a devices.

37 Claims, 12 Drawing Sheets

(56) References Cited

U.S. PATENT DOCUMENTS

| | | |
|---|---|---|
| 5,694,421 A | 12/1997 | Park |
| 6,055,231 A | 4/2000 | Mesecher et al. |
| 6,118,806 A | 9/2000 | Niida et al. |
| 6,144,711 A | 11/2000 | Raleigh et al. |
| 6,226,508 B1 | 5/2001 | Takahashi et al. |
| 6,260,167 B1 | 7/2001 | Lo et al. |
| 6,304,750 B1 | 10/2001 | Rashid-Farrokhi et al. |
| 6,452,981 B1 | 9/2002 | Raleigh et al. |
| 6,473,467 B1 | 10/2002 | Wallace et al. |
| 6,563,460 B2 | 5/2003 | Stilp et al. |
| 6,661,857 B1 | 12/2003 | Webster et al. |
| 6,670,310 B2 | 12/2003 | Wojtecki |
| 6,678,310 B1 | 1/2004 | Andren et al. |
| 6,690,715 B2 | 2/2004 | Webster et al. |
| 6,757,322 B2 | 6/2004 | Schilling |
| 6,934,323 B2 | 8/2005 | Hara |
| 7,006,040 B2 | 2/2006 | Henderson et al. |
| 7,082,159 B2 | 7/2006 | Larsson |
| 7,088,782 B2 | 8/2006 | Mody et al. |
| 7,106,709 B2 | 9/2006 | Davidsson et al. |
| 7,106,784 B2 | 9/2006 | Eltawil et al. |
| 7,123,662 B2 | 10/2006 | Li et al. |
| 7,161,996 B1 | 1/2007 | Steele et al. |
| 7,177,369 B2 | 2/2007 | Crilly et al. |
| 7,184,495 B2 | 2/2007 | Thomson et al. |
| 7,190,748 B2 | 3/2007 | Kim et al. |
| 7,203,245 B1 | 4/2007 | Murphy |
| 7,269,127 B2 | 9/2007 | Mody et al. |
| 7,269,224 B2 | 9/2007 | Stuber et al. |
| 7,282,617 B2 | 10/2007 | Schinski et al. |
| 7,286,617 B2 | 10/2007 | Vanderperren et al. |
| 7,327,717 B2 | 2/2008 | Borowski et al. |
| 7,352,688 B1 | 4/2008 | Perahia et al. |
| 7,400,643 B2 | 7/2008 | Hansen et al. |
| 7,423,989 B2 * | 9/2008 | Hansen et al. ............... 370/328 |
| 7,453,793 B1 | 11/2008 | Jones, IV et al. |
| 7,466,667 B2 | 12/2008 | Jones, IV et al. |
| 7,539,260 B2 | 5/2009 | van Zelst et al. |
| 7,561,646 B2 | 7/2009 | Steele et al. |
| 7,583,746 B2 * | 9/2009 | Aoki et al. ................ 375/267 |
| 7,586,884 B2 | 9/2009 | Awater et al. |
| 7,599,332 B2 | 10/2009 | Zelst et al. |
| 7,599,333 B2 | 10/2009 | Jones et al. |
| 7,647,069 B2 | 1/2010 | Zhang |
| 7,856,068 B1 * | 12/2010 | Tung et al. ................. 375/267 |
| 7,916,803 B2 | 3/2011 | Gardner et al. |
| 7,945,007 B2 | 5/2011 | Steele et al. |
| 8,000,223 B2 * | 8/2011 | Moorti et al. ............... 370/208 |
| 8,023,397 B2 | 9/2011 | Awater et al. |
| 8,218,427 B2 * | 7/2012 | Lee et al. .................. 370/215 |
| 8,457,232 B2 | 6/2013 | Van et al. |
| 2001/0033603 A1 | 10/2001 | Olaker |
| 2002/0012411 A1 | 1/2002 | Heinzl et al. |
| 2002/0065047 A1 | 5/2002 | Moose |
| 2002/0101825 A1 | 8/2002 | Beck et al. |
| 2002/0101840 A1 | 8/2002 | Davidsson et al. |
| 2002/0105375 A1 | 8/2002 | Sorokine |
| 2002/0111142 A1 | 8/2002 | Klimovitch |
| 2002/0114269 A1 | 8/2002 | Onggosanusi et al. |
| 2002/0118635 A1 | 8/2002 | Nee |
| 2002/0118771 A1 | 8/2002 | Larsson |
| 2002/0122511 A1 | 9/2002 | Kwentus et al. |
| 2002/0159537 A1 | 10/2002 | Crilly, Jr. |
| 2002/0160737 A1 | 10/2002 | Crawford |
| 2002/0163933 A1 | 11/2002 | Benveniste |
| 2002/0181509 A1 | 12/2002 | Mody et al. |
| 2003/0012160 A1 | 1/2003 | Webster et al. |
| 2003/0058951 A1 | 3/2003 | Thomson et al. |
| 2003/0072255 A1 | 4/2003 | Ma et al. |
| 2003/0072452 A1 | 4/2003 | Mody et al. |
| 2003/0076777 A1 | 4/2003 | Stuber et al. |
| 2003/0153275 A1 | 8/2003 | Oh et al. |
| 2003/0210646 A1 | 11/2003 | Ohseki et al. |
| 2003/0235255 A1 | 12/2003 | Ketchum et al. |
| 2003/0236108 A1 | 12/2003 | Li et al. |
| 2004/0001430 A1 | 1/2004 | Gardner |
| 2004/0005018 A1 | 1/2004 | Zhu et al. |
| 2004/0005022 A1 | 1/2004 | Zhu et al. |
| 2004/0030530 A1 | 2/2004 | Li et al. |
| 2004/0032825 A1 | 2/2004 | Halford et al. |
| 2004/0048574 A1 | 3/2004 | Walker et al. |
| 2004/0052231 A1 | 3/2004 | Ramaswamy et al. |
| 2004/0071104 A1 | 4/2004 | Boesel et al. |
| 2004/0100939 A1 | 5/2004 | Kriedte et al. |
| 2004/0105512 A1 | 6/2004 | Priotti |
| 2004/0114546 A1 | 6/2004 | Seshadri et al. |
| 2004/0116112 A1 | 6/2004 | Gray |
| 2004/0120428 A1 | 6/2004 | Maltsev et al. |
| 2004/0161046 A1 * | 8/2004 | Schott et al. ................ 375/260 |
| 2004/0190560 A1 | 9/2004 | Maltsev et al. |
| 2004/0198265 A1 | 10/2004 | Wallace et al. |
| 2004/0203383 A1 | 10/2004 | Kelton et al. |
| 2004/0204026 A1 | 10/2004 | Steer et al. |
| 2004/0240402 A1 | 12/2004 | Stephens |
| 2004/0242273 A1 | 12/2004 | Corbett et al. |
| 2004/0258025 A1 | 12/2004 | Li et al. |
| 2004/0266375 A1 | 12/2004 | Li et al. |
| 2005/0002327 A1 | 1/2005 | Li |
| 2005/0018754 A1 | 1/2005 | Song |
| 2005/0030886 A1 | 2/2005 | Wu et al. |
| 2005/0047384 A1 | 3/2005 | Wax et al. |
| 2005/0105460 A1 * | 5/2005 | Suh et al. .................. 370/203 |
| 2005/0152314 A1 | 7/2005 | Sun et al. |
| 2005/0157801 A1 | 7/2005 | Gore et al. |
| 2005/0163081 A1 * | 7/2005 | Aoki et al. ................. 370/334 |
| 2005/0180353 A1 * | 8/2005 | Hansen et al. .............. 370/328 |
| 2005/0180360 A1 | 8/2005 | Hansen et al. |
| 2005/0237992 A1 | 10/2005 | Mishra et al. |
| 2005/0281241 A1 | 12/2005 | Webster et al. |
| 2006/0013180 A1 | 1/2006 | Gupta et al. |
| 2006/0013327 A1 | 1/2006 | Sugar et al. |
| 2006/0034389 A1 * | 2/2006 | Aoki ........................ 375/299 |
| 2006/0088120 A1 | 4/2006 | Hansen et al. |
| 2006/0258303 A1 | 11/2006 | Taira et al. |
| 2006/0270364 A1 * | 11/2006 | Aoki ........................ 455/101 |
| 2006/0281487 A1 * | 12/2006 | Girardeau et al. .......... 455/553.1 |
| 2007/0117523 A1 | 5/2007 | Weber et al. |
| 2009/0238299 A1 | 9/2009 | van Zelst et al. |
| 2011/0317775 A1 | 12/2011 | Gardner et al. |
| 2013/0070747 A1 | 3/2013 | Gardner et al. |

FOREIGN PATENT DOCUMENTS

| | | |
|---|---|---|
| EP | 0657968 A1 | 6/1995 |
| JP | 63033028 A | 2/1988 |
| JP | 07211392 | 8/1995 |
| JP | 11145896 A | 5/1999 |
| JP | H11177544 A | 7/1999 |
| JP | 2001292128 A | 10/2001 |
| JP | 2003008676 | 1/2003 |
| JP | 2003018119 A | 1/2003 |
| JP | 2003503889 A | 1/2003 |
| JP | 2003069546 | 3/2003 |
| JP | 2003115812 | 4/2003 |
| JP | 2003143106 | 5/2003 |
| JP | 2003163669 A | 6/2003 |
| JP | 2003169008 A | 6/2003 |
| JP | 2003319005 A | 11/2003 |
| JP | 2003348048 | 12/2003 |
| JP | 2004503130 A | 1/2004 |
| JP | 2004153529 A | 5/2004 |
| JP | 2004214726 A | 7/2004 |
| JP | 2004289373 A | 10/2004 |
| JP | 2004297172 | 10/2004 |
| JP | 2004328267 A | 11/2004 |
| JP | 2004364286 A | 12/2004 |
| JP | 2005198214 A | 7/2005 |
| JP | 2005528002 A | 9/2005 |
| JP | 2005295401 A | 10/2005 |
| JP | 2006507753 | 3/2006 |
| JP | 2006197375 A | 7/2006 |
| WO | WO0105088 A1 | 1/2001 |
| WO | WO2004027921 A2 | 4/2004 |
| WO | WO2004045102 A1 | 5/2004 |

(56) References Cited

FOREIGN PATENT DOCUMENTS

| WO | 2004049618 A1 | 6/2004 |
|---|---|---|
| WO | WO2005002073 A1 | 1/2005 |
| WO | WO2005002141 A1 | 1/2005 |
| WO | WO2005006700 A1 | 1/2005 |
| WO | WO2005022760 A1 | 3/2005 |

OTHER PUBLICATIONS

Bangerter, Boyd et al.: "High-Throughput Wireless LAN Air Interface", 2003, Intel Technology Journal, vol. 7, No. 3, pp. 47-57.

Boer, Jan et al.: "Backwards compatability: How to make a MIMO-OFDM system backwards compatible and coexistence with 11a/g at the link level", 2003, IEEE 802.11-03/714r0, slides 1-26.

IEEE STD 802.11a-1999, Supplement to IEEE Standard for Information technology—Telecommunications and information exchange between systems—Local and metropolitan area networks—Specific requirements—Part 11: Wireless LAN Medium Access Control (MAC).

Larsson, Erik G. et al.: "Preamble Design for Mulitple-Antenna OFDM-Based WLANs With Null Subcarriers", 2001, IEEE Signal Processing Letters, 8:11:285-288.

Li, Ye G. et al.: "Channel Estimation for OFDM Systems with Transmitter Diversity in Mobile Wireless Channels", 1999, IEEE J. Select Areas Commun., 17: 461-471.

M. Singh et al., "WWiSE Proposal: High throughput extension to the 802.11 Standard", Nov. 12, 2004, pp. 32-43, §20.3, IEEE 802.11-04/0886r5.

Negi, Rohit et al.: "Pilot Tone Selction for Channel Estimation in a Mobile OFDM System", 1998, IEEE Trans. Consumer Electron, 44: 1122-1128.

Syed Aon Mujtaba, Agere Systems, "TGn Sync Proposal Technical Specification", Jan. 18, 2005, pp. 110-135, §11, IEEE 802.11-04/0889r3.

Syed Aon Mujtaba, Agere Systems, et al., "TGn Sync Compelte Proposal", Jan. 18, 2005, pp. 24-42, IEEE 802.11-04/888r8.

Tung, Tai-Lai et al: "Channel Estimation and Adaptive Power Allocation for Performance and Capacity Improvement of Multiple-Antenna OFDM Systems", 2001, Proc. IEEE Signal Processing Workshop on Signal Processing Advances in Wireless Comm. 82-85.

Van Nee, Richard et al.: "New High-Rate Wireless LAN Standards", 1999, IEEE Commun. 37 82-88.

International Search Report–PCT/US05/018566—International Search Authority, US—Apr. 12, 2006.

Written Opinion—PCT/US05/018566—International Search Authority, US—Apr. 12, 2006.

International Preliminary Report on Patentability—PCT/US05/018566—The International Bureau of WIPO, Geneva, Switzerland—Nov. 29, 2006.

Andren et al.: CCK, The new IEEE 802.11 standard for 2.4 GHz wireless LANs, International IC Conf. Proceedings, pp. 25-39, May 3, 2000.

Chinese Office Action mailed Feb. 28, 2011 for Chinese application No. 200580049854.8, 26 pages.

Chinese Office Action mailed Sep. 1, 2010 for Chinese Patent Application No. 200580049854.8, 27 pages.

European OA dated Jan. 24, 2008 for EP Application Serial No. 05 729 464.7-2415, 2 pages.

European OA dated Aug. 19, 2008 for EP Application Serial No. 05 729 464.7-2415,17pages.

Halls, G. A., "Hiperlan—The 20 MBIT/S Radio Lan," IEE Colloquim on Radio LANs and MANs . . . , pp. 1-8 (1995).

IEEE, Part 11: Wireless LAN Medium Access Control (MAC) and Physical Layer (PHY) Specifications. 1999, IEEE, chapters 9 and 11.*.

IEEE Std 802.11b-1999, "Part 11: Wireless LAN Medium Access Control (MAC) and Physical Layer (PHY) specifications: Higher-Speed Physical Layer Extension in the 2.4 GHz Band," IEEE-SA Standards Board, Supplement to ANSI/IEEE Std. 802.11, 1999 Edition, Approved Sep. 16, 1999.

Mujtaba, Aon et al, "TGn Sync Proposal", IEEE 802.11-04/888r0, Aug. 2004.

Office Action for Japanese Patent Application Serial No. 2008-502955 dated Jun. 1, 2010, 4 pages.

Office Action for Japanese Patent Application Serial No. 2008-502955 dated Mar. 8, 2011, 2 pages.

Office Action in U.S. Appl. No. 11/139,925 dated Apr. 1, 2008. 22 pages.

Office Action in U.S. Appl. No. 11/139,925 dated Sep. 3, 2008, 28 pages.

Office Action mailed Feb. 19, 2010 for European Patent Application No. 05729464.7, 45 pages.

Talisa, S.H et al.: "A Novel MSW Programmable Barker Coder/Decoder," Microwave Symposium Digest, MTT-S International, vol. 86, Issue: 1, Jun. 2, 1986, pp. 579-581.

* cited by examiner

MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES

CROSS-REFERENCE TO RELATED APPLICATIONS

The present application is a continuation of U.S. application Ser. No. 11/140,349, filed May 27, 2005, now allowed, entitled "MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES", which is a continuation-in-part of pending U.S. application Ser. No. 10/820,440, filed Apr. 5, 2004, entitled "MODIFIED PREAMBLE STRUCTURE FOR IEEE 802.11A EXTENSIONS TO ALLOW FOR COEXISTENCE AND INTEROPERABILITY BETWEEN 802.11A DEVICES AND HIGHER DATA RATE, MIMO OR OTHERWISE EXTENDED DEVICES", the contents of which are incorporated by reference herein in their entirety.

The present application also claims benefit under 35 USC 119(e) of U.S. provisional application No. 60/575,608, filed May 27, 2004, entitled "MODIFIED PREAMBLE STRUCTURE FOR IEEE 802.11A EXTENSIONS AND DETECTING THE NUMBER OF TRANSMIT ANTENNAS IN MEMO OR MISO COMMUNICATION SYSTEMS", the content of which is incorporated herein by reference in its entirety.

BACKGROUND OF THE INVENTION

The IEEE 802.11a standard defines data rates of 6 Mbps (megabits per second) up to 54 Mbps. For some applications, higher data rates for given modulations and data rates higher than 54 Mbps are desirable. Other extensions, such as the use of MIMO (multiple-input, multiple-output) antenna systems and other extensions might be desirable. In order to avoid conflicts with existing standardized communications and devices, extended devices that extend beyond the limits of the 802.11a standard and legacy devices that comply with the existing standard and are not necessarily aware of extended standards both need to coexist in a common communication space and even interoperate at times.

Coexistence is where differing devices can operate in a common space and still perform most of their functions. For example, an extended transmitter transmitting to an extended receiver might coexist with a legacy transmitter transmitting to a legacy receiver and the extended devices can communicate while the legacy devices communicate, or at least where the two domains are such that one defers to the other when the other is communicating. Coexistence is important so that the adoption and/or use of extended devices (i.e., devices that are outside, beyond or noncompliant with one or more standards with which legacy devices adhere and expect other devices to adhere) do not require replacement or disabling of existing infrastructures of legacy devices.

Interoperability is where an extended device and a legacy device can communicate. For example, an extended transmitter might initiate a transmission in such a manner that a legacy device can receive the data sent by the extended transmitter and/or indicate that it is a legacy device so that the extended transmitter can adjust its operations accordingly. For example, the extended transmitter might revert to standards compliant communications or switch to a mode that, while not fully standards compliant, is available to the legacy receiver. In another situation, an extended receiver might successfully receive data from a legacy transmitter.

The IEEE 802.11a standard defines a 20 microsecond long preamble with a structure as shown in FIG. 1, having short training symbols S (0.8 microseconds each), a guard interval LG, long training symbols L (3.2 microseconds each) and a signal field (4 microseconds). The preamble is followed by data. The first eight microseconds comprises ten identical short training symbols that are used for packet detection, automatic gain control and coarse frequency estimation. The second eight microseconds comprise two identical long training symbols, L, preceded by a guard interval LG that is the same pattern as the last half (1.6 microseconds) of the long training symbol L. The long training symbols can be used for channel estimation, timing, and fine frequency estimation.

FIG. 2 shows a long training sequence, $L_1$, that is used to generate the signal representing the long training symbol in a conventional 802.11a preamble. This sequence represents values used over a plurality of subcarriers. As specified in the standard, the subcarriers span a 20 MHz channel and with 64 subcarriers, they are spaced apart by 312.5 kHz. By convention, used here, the first value in the sequence is the value for the DC subcarrier, followed by the value for the 1×312.5 kHz subcarrier, then the value for the 2×312.5=625 kHz subcarrier, etc., up to the 32nd value for the 31×312.5 kHz=9687.5 kHz subcarrier. The 33rd value corresponds to the −10 MHz subcarrier, followed by the −(10 MHz−312.5 kHz) subcarrier, and so on, with the 64 value being for the −312.5 kHz subcarrier.

As can be seen from FIG. 1, the DC value and the 28th through 38th values, corresponding to the edges of the 20 MHz channel, are zero. The output of a transmitter is a training symbol at a sample rate of 64 samples symbol. The samples are obtained by taking a 64-point IFFT (inverse fast-Fourier transform) of the long training sequence. $L_1$ in this example. As used herein, a sequence in the frequency domain is expressed with uppercase letters (e.g., L(k)), while the corresponding time sequence is expressed with lowercase letters (e.g., 1(k)).

One approach to obtaining higher data rates is the use of more bandwidth. Another approach, used by itself or as well as the use of more bandwidth, is MIMO (multiple-input, multiple-output) channels, where a plurality of transmitters transmit different data or the same data separated by space to result in possibly different multi-path reflection characteristics. In either case, care is needed for coexistence and interoperability between legacy devices and extended devices.

BRIEF SUMMARY OF THE INVENTION

A modified preamble is used by extended devices that operate at higher rates, MIMO or other extensions relative to strict 802.11a-compliant devices. The extended devices might use one or more of multiple antenna techniques (MIMO), where multiple data streams are multiplexed spatially and multi-channel techniques, where an extended transmitter transmits using more than one 802.11a channel at a time. Such extensions to IEEE 802.11a can exist in extended devices.

The modified preamble is usable for signaling, to legacy devices as well as extended devices, to indicate capabilities and to cause legacy devices or extended devices to defer to other devices such that the common communication channel is not subject to unnecessary interference. The modified preamble is also usable for obtaining MIMO channel estimates and/or multi-channel estimates.

The modified preamble preferably includes properties that facilitate detection of conventional and/or extended modes ("mode detection") and provides some level of coexistence with legacy IEEE 802.11a devices. The modified preambles may include modifications in the short training symbols, long training symbols, and/or the signal field. In some embodiments, the modified preamble includes both legacy 802.11a sequences as well as modified preamble sequences. In yet other embodiments, energy is transmitted on every single tone except the DC tone of the long training sequence of the modified preamble.

BRIEF DESCRIPTION OF THE DRAWINGS

FIG. 4 illustrates other long training sequences, usable by extended devices.

DETAILED DESCRIPTION OF THE INVENTION

The use of modified preambles is described herein. Such modified preambles can be used in packets sent over a wireless network, such as an 802.11a compliant wireless network. Such packets with modified preambles can be sent by transmitters according to embodiments of the present invention to be received by receivers according to embodiments of the present invention, as well as being received by legacy receivers that are not configured to receive and interpret the modified preambles as would be done with receivers according to embodiments of the present invention.

Figure 3:
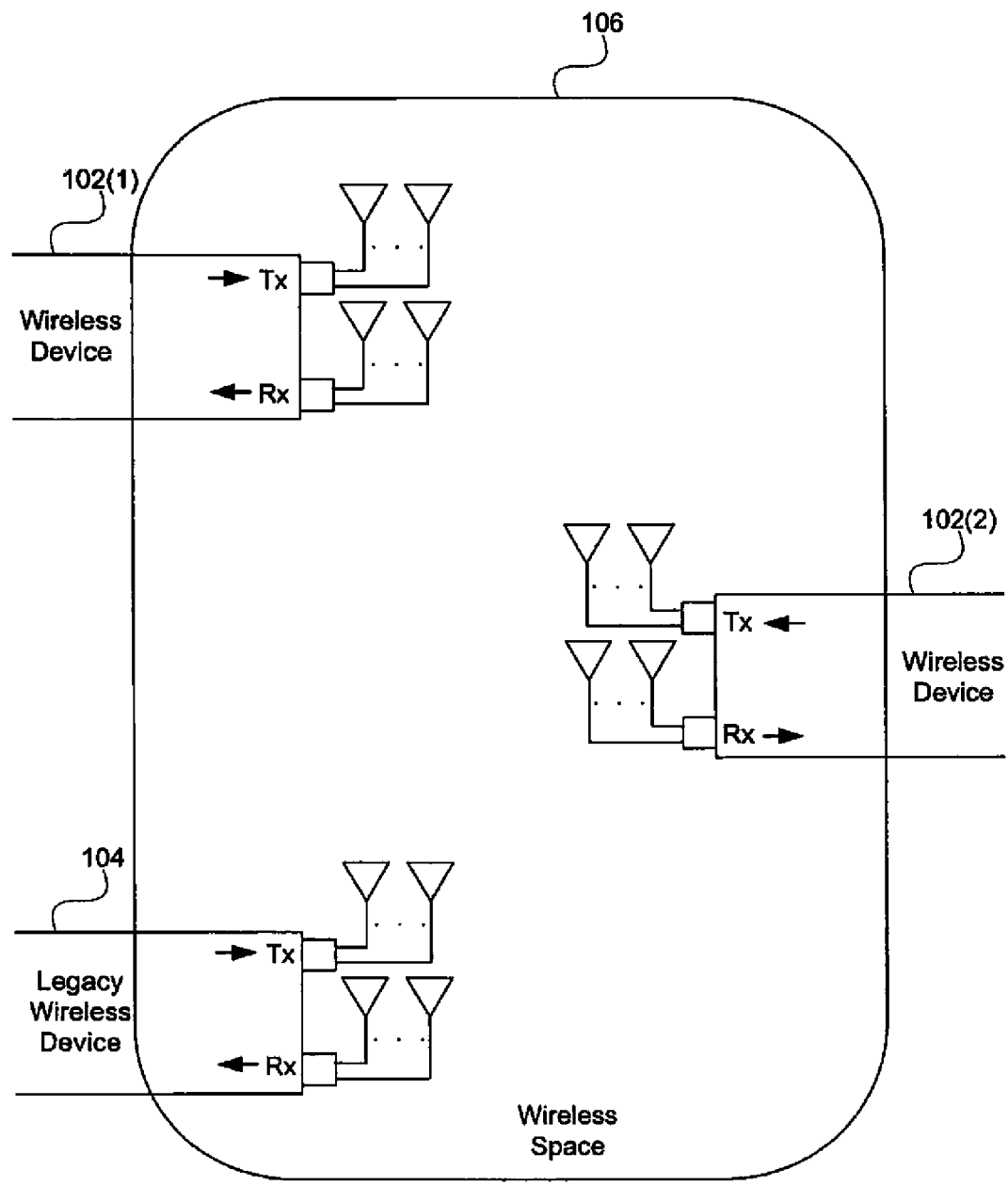
FIG. 3 illustrates several devices coupled via a wireless network.

FIG. 3 illustrates just one example of a wireless network being used for communications among transmitters and receivers as indicated. As shown, two wireless devices 102(1), 102(2) might use and interpret the modified preambles, while a legacy wireless device 104 might not be expecting the modified preambles, but might hear signals representing such preambles. Extended wireless devices 102 might operate using multiple channels and/or multiple transmit antennas and/or multiple receive antennas. Devices might have a single transmit antenna and a single receive antenna, or more than one transmit antenna and/or more than one receive antenna. While separate transmit and receive antennas are shown, antennas might be used for both transmitting and receiving in some devices.

Border 106 is not a physical border, but is shown to represent a space within which signals can be received from devices within the space. Thus, as one device transmits a signal representing a packet within border 106, other devices within border 106 pick up the signals and, as they are programmed, will attempt to determine if the signals represent packets and if so, then demodulate/decode the packets to obtain the data represented therein.

Many variations of a modified preamble might be used. An example is the preamble shown in FIG. 1, where the long training symbol is modified to use sequences such as one of the example sequences shown in FIG. 4.

Preferably, a modified preamble will be such that 1) an extended receiver (e.g., one that can advantageously handle modified preambles) can distinguish between MIMO packets (or other extended mode packets) and conventional 802.11a packets, 2) a legacy receiver (e.g., one that is not configured to receive and interpret the modified preambles and might not expect extended operations) can receive enough of a packet to determine either that the legacy receiver can understand the packet or can defer processing of incoming signals for a time, thereby allowing a measure of coexistence, 3) the modified preamble is usable for MIMO synchronization and channel estimation, and 4) the modified preamble is useful in a process of detecting the use of multi-channel transmission. In some embodiments of wireless devices according to the present invention, modified preambles are used that provide one, two, three or all of the preferable characteristics indicated above.

Combinations of Extensions

Multi-channel extended 802.11 systems might simultaneously transmit on several 20 MHz channels, whereas a legacy 802.11a system only transmits on a single 20 MHz channel using a single antenna, or if the legacy system does transmit with more than one antenna, each of the antennas transmits the same 802.11a signal, possibly with some delay differences between signals. As a result, data rates can be increased over 802.11a data rates using multiple transmit antennas or multiple channels or a combination of both. Thus, in a communication channel, such as the airspace of a wireless network cloud, several types of packets might be present:

1) Legacy SISO (single-input, single-output) 802.11a, 802.11b, or 802.11g packets transmitted in a single 20 MHz channel;

2) Extended SISO in multiple 20 MHz channels (e.g., 40, 60, 80, or 100 MHz channels)

3) Extended MIMO in a single 20 MHz channel;

4) Extended MIMO in multiple 20 MHz channels (e.g., 40, 60, 80, or 100 MHz channels)

Several satisfactory modified preamble structures can be derived by one of ordinary skill in the art after reading this disclosure. Some examples are described below. Preferably, the unmodified preamble structure can provide interoperability and coexistence between SISO and MIMO systems at various channel widths and coexistence between extended mode systems and legacy systems.

MIMO Single Channel (20 MHz)

Figures 1, 2:
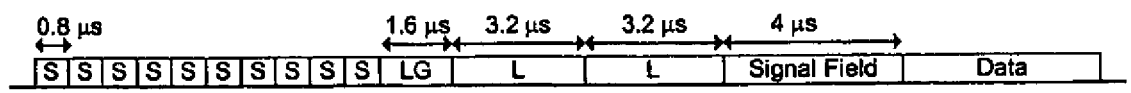
FIG. 1 illustrates the structure of a conventional 802.11a preamble.
FIG. 2 shows the frequency-domain symbols, starting with the DC subcarrier, of a long training symbol sequence, $L_1$, used for a conventional 802.11a preamble.

A modified preamble can use the same structure as the 802.11a preamble, with a different long training symbol determined from a long training symbol sequence $L_D$. By keeping the same short symbols S, or by applying cyclic shifts on S for the second, third, etc. transmit antennas, and using the same timing structure as depicted in FIG. 1, a receiver using the extended mode can use the same hardware for detecting the repetitive S and L symbols, even though the actual contents of the L symbols may be different for the 802.11a extensions.

Various embodiments of wireless devices might use various long training symbol sequences. In one example of a modification, the long training symbol sequence $L_D$ has one or more of the following features: 1) it is formulated such that channel estimation can be done for multiple transmitters, 2) it is such that it has a low cross-correlation with the unmodified 802.11a long training symbol sequence, and/or 3) it is usable in a relatively simple process of detecting whether the preamble is an 802.11a packet or an extended mode packet, usable in multipath channels. Suitable modified long training symbol sequences are shown as $L_2$ and $L_3$, in FIG. 4, but other variations should be apparent upon reading this description.

Channel Estimation

By allowing for channel estimation for multiple transmitters, MIMO or space-time coding techniques can be supported to achieve 802.11a extensions. One way to do this is by sending a different set of subcarriers from each transmitter. As an example, for the case of two transmitters, a device might modulate its OFDM subcarriers with the 64 values of $L_3$, shown in FIG. 4, where one transmitter transmits the odd subcarriers $\{1, 3, \ldots, 63\}$ and the other transmitter transmits the even subcarriers $\{0, 2, \ldots, 62\}$. Thus, one transmitter would take an IFFT of the odd subcarriers of that time varying signal and the other transmitter would take an IFFT of the even subcarriers and transmit samples of that time varying signal.

$L_3$ is a modified 802.11a long training symbol sequence, wherein some of the subcarriers of the standard 802.11a sequence $L_1$ (shown in FIG. 2) are inverted, and some subcarriers that are zero in $L_1$ are non-zero in $L_3$. The latter has some advantages for channel estimation, but is not necessary for the purpose of discriminating 802.11a packets from extended mode packets.

Low Cross-Correlation

Figure 4:
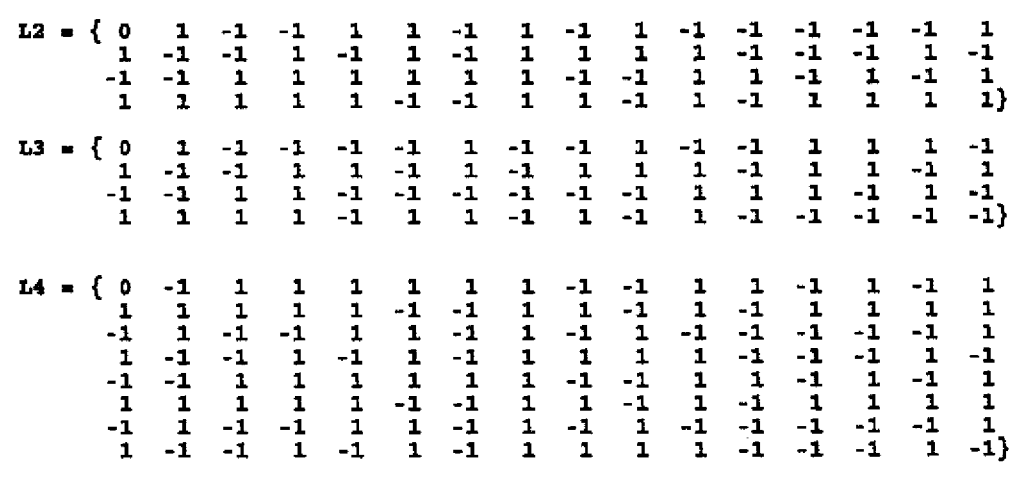

The second criterion is that the new training sequence should have a low cross-correlation with the conventional IEEE 802.11a training sequence. One way to achieve this is to invert every other group of four subcarriers, which is applied to sequence $L_2$ to get a new sequence $L_3$ that is nearly orthogonal to both $L_1$ and $L_2$. Further, $L_3$ is constructed such that there is also a low cross-correlation between the even and odd elements of $L_2$ and $L_3$. These sequences $L_2$ and $L_3$ are shown in FIG. 4. The low cross-correlation is illustrated by Equation 1 and Equation 2 (note that in Equation 1, a high cross-correlation would have right-hand side values closer to −32 or 32, since the sum is not normalized here).

$$\sum_{k=0}^{31} L_2(2k)L_3(2k) = -1 \quad \text{(Equ. 1)}$$

$$\sum_{k=0}^{31} L_2(2k+1)L_3(2k+1) = 0 \quad \text{(Equ. 2)}$$

Mode Detection

The low cross-correlation between even and odd elements of $L_2$ and $L_3$ supports the third criterion, as it makes it possible to detect extended mode packets by looking at the correlation of $L_2$ and $L_3$ with the odd and even subcarriers of a received packet.

Various methods can be available for a receiver to detect from a received signal whether a transmitter transmitted a conventional 802.11a packet or an extended mode packet. One method for detecting what type of packet was sent will now be described.

In this method, enough of the signal is received to identify what should be the two repeated long training symbols, typically sampled as two identical repetitions of 64 samples for each receive antenna. An FFT (fast-Fourier transform) of the sum of the two identical repetitions of 64 samples is taken, generating an output sequence $s_i(k)$, comprising 64 complex values per receive antenna, containing channel amplitudes and phases, as well as phase shifts caused by the long training symbol sequence that was actually used (e.g., sequences such as $L_1$, $L_2$, $L_3$ or $L_4$).

From the output sequence $s_i(k)$, the receiver generates two other sequences, $r_s(k)$ and $r_m(k)$, by multiplying $s_i(k)$ by the sequences $L_2$ and $L_3$ for each receive antenna i, as illustrated by Equations 3a and 3b.

$$r_{si}(k) = \sum_{k=0}^{63} S_i(k)L_2(k) \quad \text{(Equ. 3a)}$$

$$r_{mi}(k) = \sum_{k=0}^{63} S_i(k)L_3(k) \quad \text{(Equ. 3b)}$$

Next, the receiver calculates two metrics, $m_m$ and $m_s$, from $r_s(k)$ and $r_m(k)$ using a differential detection operation, such as that illustrated by Equations 4a and 4b.

$$m_s = \left\| \sum_{i=0}^{N-1} \sum_{k=2}^{26} [r_{si}(k)r_{si}^*(k-1) + r_{si}(k+37)r_{si}^*(k+36)] \right\| \quad \text{(Equ. 4a)}$$

$$m_m = \left\| \sum_{i=0}^{N-1} \sum_{k=0}^{11} [r_{mi}(2k+3)r_{mi}^*(2k+1) + r_{mi}(2k+41)r_{mi}^*(2k+39) + r_{mi}(2k+4)r_{mi}^*(2k+2) + r_{mi}(2k+42)r_{mi}^*(2k+40)] \right\| \quad \text{(Equ. 4b)}$$

If $m_m > c \cdot m_s$, then the receiver might assume that the received signal represents a conventional 802.11a packet, otherwise the receiver assumes the packet is an extended mode packet. The constant c is preferably equal to 1, but may be different.

SISO/MIMO Multiple Channel

Some modified preamble structures described herein provide interoperability and coexistence between SISO multi-channel packets/devices and MIMO multi-channel packets/devices, as well as coexistence between multi-channel packets/devices and legacy packets/devices.

Figure 5:
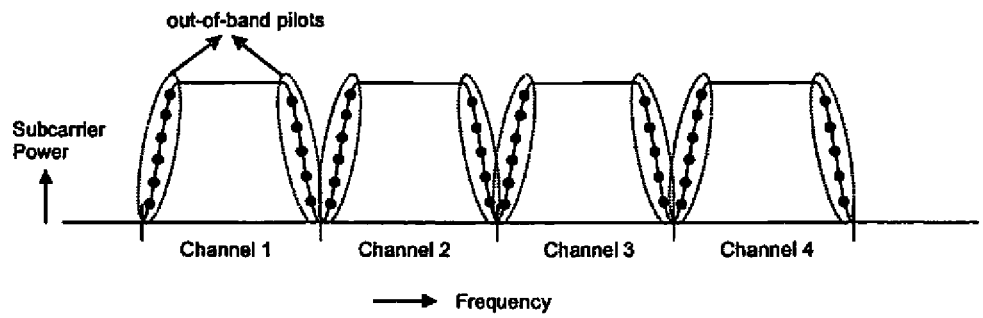
FIG. 5 illustrates one possible layout for out-of-band pilot tones for individual channels.

FIG. 5 illustrates the case where out-of-band pilots are attenuated for 20 MHz channels used to transmit a MIMO signal. The preamble structure can be identical to a conventional 802.11a preamble, except that the long training symbol sequence may use what are otherwise considered out-of-band subcarriers. Some or all of these out-of-band subcarriers may also be used in the data symbols to increase the data rate.

In the case of FIG. 5, different channels may be used by different devices, but it is also possible that the same device transmits on several channels simultaneously. For instance, one device may transmit on channels 1 and 4 simultaneously, while channels 2 and 3 are used by other devices.

Figure 6:
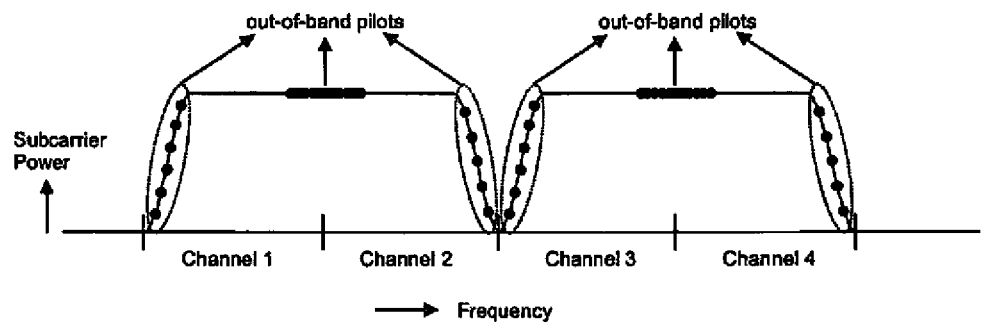
FIG. 6 illustrates one possible layout for out-of-band pilot tones for commonly assigned adjacent individual channels, where the out-of-band signals between adjacent bands are not attenuated.

If two adjacent channels are used simultaneously by one device, then there is no need to attenuate the "out-of-band subcarriers" in the middle of this 40 MHz band. An example of this is shown in FIG. 6. The out-of-band subcarriers that are in between the two 20 MHz channels thus need not be attenuated. In FIG. 4, the sequence $L_4$ is the long training symbol sequence for a 40 MHz preamble, which contains all 128 subcarrier values for a 40 MHz channel long training symbol. The first 32 values are identical to the last 32 values of a 20 MHz preamble, corresponding to the subcarriers in the left part of a 20 MHz channel. One difference between $L_4$ and two separate 20 MHz long training sequences is that the DC subcarriers are at different locations, so at the position where a 20 MHz channel would normally have its DC subcarrier, the 40 MHz sequence can have a nonzero subcarrier value. In $L_4$, these are subcarrier numbers 33 and 97, respectively.

With unattenuated out-of-band subcarriers, signaling information can be carried on those subcarriers during packet setup, such as signaling operating and/or extension modes during a preamble, and additional data can be carried on those subcarriers, to increase the data rate.

Figure 7:
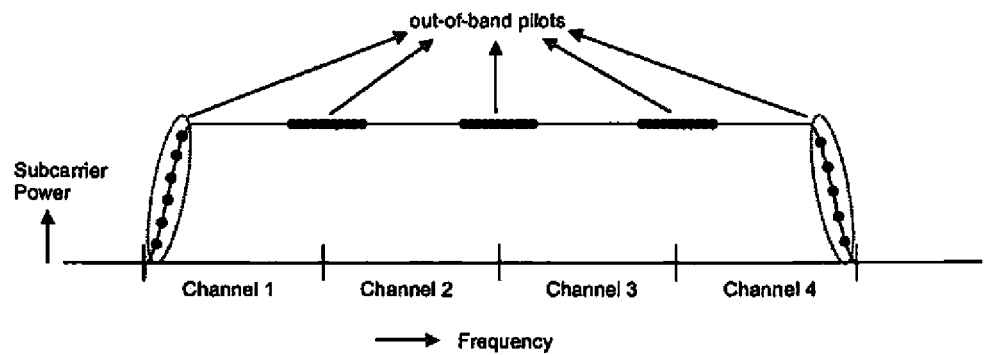
FIG. 7 illustrates a layout for out-of-band pilot tones for four adjacent individual channels assigned to a single device, where the out-of-band signals between adjacent bands are not attenuated.

FIG. 7 shows the case of four 20 MHz channels.

Figure 8:
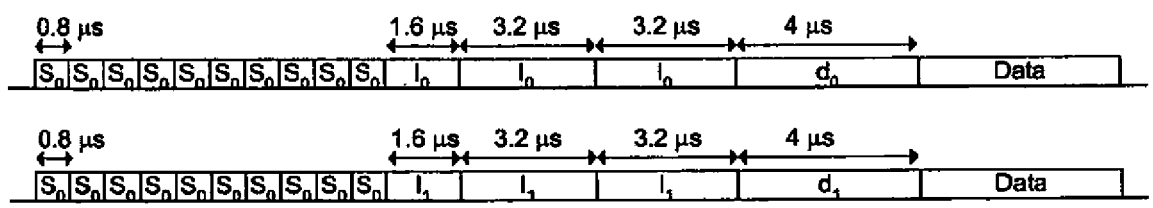
FIG. 8 illustrates a modified preamble usable for multi-channel packets with or without MIMO.

One example of a modified preamble is the preamble shown in FIG. 1 modified as shown in FIG. 8. The long training symbol values for these out-of-band subcarriers can be the same as in the case of FIG. 1. The long training symbol is followed by a replica of the Signal field with identical subcarrier values in each of the 20 MHz channels overlaid by the same effects (e.g., time-domain cyclic shift or frequency-domain scrambling pattern) as the long training symbol of the corresponding transmit antenna or spatial stream. This ensures that a receiver that operates on just one of the 20 MHz channels will still be able to successfully decode at least the first part of the packet containing the Signal field and defer for the rest of the packet, as decoding the Signal field provides the receiver with information about the length of the packet and thus how long to defer. The same technique can be extended to an arbitrary number of channels.

FIG. 8 shows a preamble for a two transmitter MIMO packet. The structure is the same as for 802.11a, but some differences are that a) $l_0$, $l_1$, $d_0$, $d_1$ may contain out-of-band subcarriers, b) $s_1$, $l_1$, $d_1$ can be cyclically shifted relative to $s_0$, $l_0$, $d_0$ or c) $l_0$ and $l_1$ can contain subcarrier sequences that have a low cross-correlation with the same subcarrier sequences of the 802.11a long training symbol sequence.

Interoperability

Interoperability between the different extended modes can be ensured by transmitting the same preamble and signal field in each 20 MHz channel. The preamble time structure can be the same as that of IEEE 802.11a, as illustrated in FIG. 1. For a 20 MHz MIMO transmitter, the long training symbol L can be modified to facilitate MIMO channel estimation and include out-of-band pilots. In one example of an extended transmitter using a plurality of channels, the transmitter transmits an identical copy of the preamble and signal field in each 20 MHz channel used by that transmitter where the out-of-band pilots only have to be attenuated at the edges of a multi-channel and not between adjacent channels of the multi-channel. The subcarriers of the signal field might contain different data bits for different 20 MHz channels, to signal information such as the transmitter's multi-band mode, MIMO mode, channel number, data rate, and/or coding rate.

By transmitting the same preamble and signal field in any 20 MHz channel, it is ensured that an extended device that only demodulates one 20 MHz channel at least is able to decode the signal field. From the information in the signal field, the single-channel extended device can either properly defer for the duration of the packet or find out what extended mode is used for this packet in the case that this information is encoded in the signal field. For instance, the receiver could detect from the signal field that the packet is transmitted over four adjacent channels, after which the extended receiver can decide to switch to a four-channel receiving mode.

Notice that it typically does not matter for a single-channel 20 MHz receiver whether the out-of-band subcarriers depicted in FIGS. 5-7 are attenuated. For instance, if a single-channel receiver demodulates channel 2 out of the 4 transmitted channels shown in FIG. 7, the receive filter of that single-channel receiver will partly attenuate the out-of-band subcarriers as well as suppress the adjacent channels 1 and 3 to the point where these adjacent channels do not cause interference to the desired signal of channel 2.

Coexistence

One method of having coexistence between extended devices and legacy IEEE 802.11a and IEEE 802.11g devices is by keeping the preamble structure in each 20 MHz channel the same as for IEEE 802.11a. IEEE 802.11a specifies an energy detect based defer behavior, which provides some level of coexistence. However, to guarantee that legacy devices properly defer for all extended mode packets down to received power levels of −82 dBm or other suitable levels, the receivers have to be able to successfully decode the signal field, which contains the length information of the packet.

Some ways to do this are described by Bangerter, B., et al., "High-Throughput Wireless LAN Air Interface", Intel Technology Journal, Vol. 7, Issue 3 (August 2003) (hereinafter "Bangerter") and Boer, J., et al., "Backwards Compatibility", IEEE 802.11 presentation, Document Number 802.11-03/714r0 (September 2003) (hereinafter "Boer").

Bangerter describes the use of multiple 802.11a preambles spread in frequency such that 20 MHz channel legacy 802.11a devices will defer for multiple channel devices, but additional advantages can be had through the use of out-of-band pilots or MIMO preambles, as described elsewhere herein.

Boer describes some possible MIMO preambles having some limited benefits. In one method described in Boer, each MIMO transmitter transmits an 802.11a preamble while the other transmitters transmit nothing. While this makes distinguishing easier, training is significantly longer and that reduces throughput. In another method described in Boer, each MIMO transmitter transmits a part of the 802.11a subcarriers. For example, for two transmitters, one transmitter transmits all odd subcarriers and the other transmitter transmits all even subcarriers. However, without more, mode detection based on the training symbols might not be possible with that technique.

A novel way of enabling coexistence or furthering coexistence for MIMO packets is to apply a cyclic delay shift on the long training symbol and Signal field IFFT outputs prior to applying the guard time extension. For example, assume L(k) and D(k) are the 64 subcarrier values for the long training symbol and Signal field symbol, respectively. For a conventional 802.11a single transmitter transmission, the time samples for the long training symbol are derived by taking the 64-point IFFT of L(k) to obtain l(i) and transmitting the samples of l(i). Thus, with the guard time, the long training symbol and guard time are constructed as [l(32:63) l(0:63) l(0:63)], i.e., the IFFT output is repeated twice and the last 32 samples are prepended to form the long training guard interval. As with the conventional timing, the long training guard interval (32 samples) is twice as long as the guard interval for 802.11a data symbols (16 samples). The signal field is formed by [d(48:63) d(0:63)], where d(0:63) are the 64 samples of the IFFT of D(k).

In the case of a two transmitter MIMO device, the first transmitter would transmit the long training symbol and signal field like that of 802.11a. The second transmitter would apply a cyclic shift such that instead of the IFFT output l(0:63), it uses the cyclically shifted samples ls=[l(32:63) l(0:31)] to construct the long training symbol samples [ls(32:63) ls(0:63) ls(0:63)]. For the signal field, it uses the shifted samples ds=[d(32:63) d(0:31)] to construct the signal field as [ds(48:63) ds(0:63)].

In a legacy 802.11a packet, one 3.2 microsecond repetition of the long training symbol L as shown in FIG. 1 is expressed in the time domain as the IFFT of L(k), where L(k) contains 64 subcarrier values, of which 52 are non-zero. The time samples l(i) are given as shown in Equation 5, where the subcarrier values of L(k):

$$l(i) = \sum_{k=0}^{63} L(k)\exp\left(j\frac{2\pi ik}{64}\right) \quad \text{(Equ. 5)}$$

In the extended modes described herein, some possible modifications will be described. First, L(k) can contain more than 52 non-zero subcarriers. Second, in the case of MIMO transmission, l(i) can have a cyclic shift that may be different for each transmitter. The shifted signal $l_k(i)$ can be derived from l(i) as $l_k(i)=l([i+64-d_k]\%64)$, where "%" denotes the modulo operator and $d_k$ is the cyclic delay of transmitter k in 20 MHz samples. This expression assumes a 20 MHz sampling rate, such that there are 64 samples in a 3.2 microsecond interval. An alternative method of generating the cyclic shift is to apply a phase ramp rotation to all subcarrier values of L(k) prior to calculating the IFFT, such as that shown by the example of Equation 6.

$$l_k(i) = \sum_{k=0}^{63} L(k)\exp\left(-j\frac{2\pi k d_k}{64}\right)\exp\left(j\frac{2\pi ik}{64}\right) \quad \text{(Equ. 6)}$$

A MIMO transmitter can have two or more transmit antennas (or antenna arrays, as the case may be). For a MIMO system with two transmit antennas and two different transmit data streams, preferred values for the cyclic delay values $d_k$ are 0 and 32 samples, respectively. This corresponds to a cyclic delay of 1.6 microseconds between the two transmitters. For three transmitters, $d_k$ can be 0, 22, and 43 samples, respectively. For four transmitters, $d_k$ can be 0, 16, 32, and 48 samples, respectively.

Figure 9A:
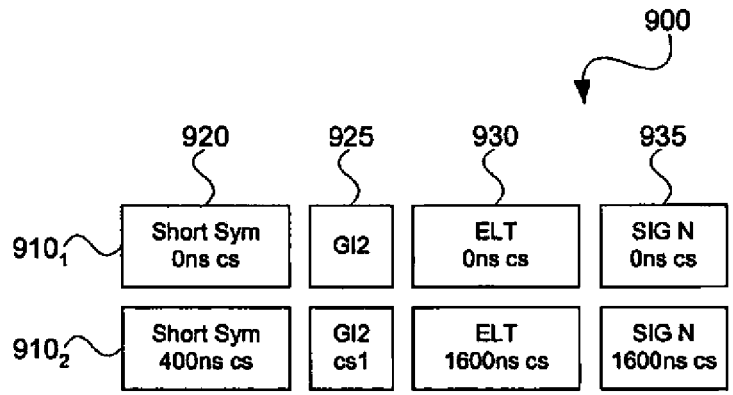
FIGS. 9A, 9B and 9C show modified preambles for systems having respectively two, three, and four transmit antennas, in accordance with one embodiment of the present invention.
Figure 9B:
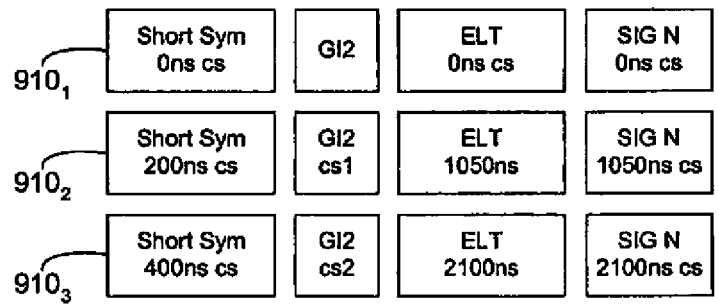
Figure 9C:
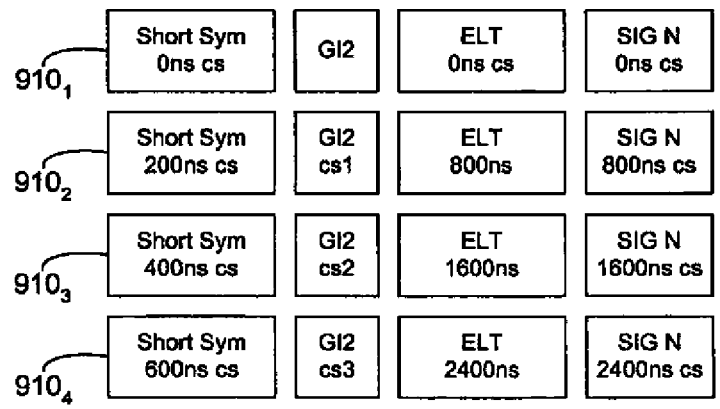

FIGS. 9A, 9B and 9C show modified preambles (also referred to alternatively as training sequences) configured for transmission via systems having two, three, and four transmit antennas respectively, in accordance with one embodiment of the present invention. Modified preamble 900 of FIG. 9A includes two preamble parts, namely preamble part $910_1$ transmitted from the first antenna and preamble part $910_2$ transmitted from the second antenna of a two-transmit antenna system. In the following, preamble parts are alternatively referred to as preambles. The short symbols of preamble $910_2$ have a cyclic shift of 400 ns with respect to the short symbols of preamble $910_1$. The extended long training (ELT) sequence of preamble $910_2$ has a cyclic shift of 1600 ns with respect to the ELT sequence of preamble $910_1$. Similarly, the Signal field of preamble $910_2$ has a cyclic shift of 1600 ns with respect to the Signal field of preamble $910_1$. Other cyclic shifts per preamble part may be used.

As described above, the combined duration for transmitting the short training sequence, guard intervals, long training sequence, and signal fields, is 20 μs. Preamble $910_1$ includes short training sequence $920_1$, a guard interval GI $925_1$, ELT sequence $930_1$ and a Signal field SIG $935_1$. Similarly, preamble $910_2$ includes short training sequence $920_2$, a guard interval GI $925_2$, ELT sequence $930_2$ and a Signal field SIG $935_2$. The GI $925_1$ and $925_2$ are obtained by taking the last 32 samples (at 20 MHz sampling rate) of ELT $930_1$ and $930_2$, respectively.

Referring to FIG. 9B, preambles $910_1$ is transmitted from the first antenna, preamble $910_2$ is transmitted from the second antenna, and preamble $910_3$ is transmitted from the third antenna of a communication system having three transmit antennas. The short sequence of preamble $910_2$ have a cyclic shift of 200 as with respect to the short sequence of preamble $910_1$. The ELT sequence of preamble $910_2$ has a cyclic shift of 1050 ns with respect to the ELT sequence of preamble $910_1$. Similarly, the Signal field of preamble $910_2$ has a cyclic shift of 1050 ns with respect to the Signal field of preamble $910_1$. The short sequence of preamble $910_3$ have a cyclic shift of 400 ns with respect to the short sequence of preamble $910_1$. The ELT sequence of preamble $910_3$ have a cyclic shift of 2100 ns with respect to the ELT sequence of preamble $910_1$. Similarly, the Signal field of preamble $910_3$ has a cyclic shift of 2100 ns with respect to the Signal field of preamble $910_1$. Other cyclic shifts per preamble part may be used.

The short-training sequence in each of the above preambles may or may not be the same as the legacy short training sequence defined by the 802.11a standard. Similarly, the ELT sequence may be the same as the legacy long training sequence or any one of the ELT sequences described. As describe above, the time span of the ELT sequence is divided by the number of transmit antennas from which cyclic shifts are derived. For example, with respect to the IEEE 802.11a preamble, the time span of the long training sequence, excluding the guard interval, is 3.2 µs. In the following, it is assumed that the $N_s$ spatial streams are directly mapped onto the $N_t$ transmit antennas, i.e., $N_s=N_t$, although it is understood that the present invention may be readily applied to more general space-time-frequency mappings where the $N_s$ spatial streams are not directly mapped to the $N_t$ transmit antennas. Furthermore, it is assumed that the cyclic shift on the first transmit antenna is 0, however, values other than 0 are also possible.

As is shown above, when there are two transmit antennas, i.e., $N_t=2$, the cyclic shift on the second transmit antenna may be 3.2/2=1.6 µs. When there are three transmit antenna, $N_t=3$, the cyclic shift on the second and third transmit antennas two may be, respectively, 1.05 µs and 2.1 µs. For $N_t=4$, the cyclic shift on the second, third, and fourth transmit antennas may be respectively, 3.2/4=0.8 µs, 2*3.2/4=1.6 µs, and 3*3.2/4=2.4 µs, as shown in FIG. 9C.

The long-training sequence per transmit antenna may be the same as that of the IEEE 802.11a standard (FIG. 1), including two consecutive long training symbols. The corresponding cyclic shift associated with each transmit antenna and which is appended with a cyclic extension of 1.6 µs, forms the cyclically-shifted ELT symbols for that transmit antenna.

To be able to decode the signal field without knowing the number of transmit antennas in advance, the signal field, SIG N, is kept the same for each transmit antennas, except that it has the same cyclic shift as that appended to the ELT symbols of that transmit antenna. Accordingly, the SIG N may be decoded using a SIMO (Single-Input Multiple-Output) training. In other words, training for the decoding of SIG N is performed assuming that the ELT sequence is transmitted from a single transmit antenna.

The exemplary preambles disclosed in FIGS. 9A, 9B, and 9C provide a number of advantages. First, the 20 microseconds duration of the preamble is relatively short, particularly for systems with three or four transmit antennas, hence a low overhead. Second, the selected cyclic shifts ensure that the power seen by the receiver is not affected by channel constructive or destructive combining. Therefore, automatic gain control may be carried out effectively throughout the preamble. Third, since the impulse responses can be separated in time, the number of spatial streams may be identified by the preamble thus enabling the receiver to identify the number of spatial channels of the MIMO. Fourth, the signal field occurs in the same place, notwithstanding the number of spatial streams. Fifth, the signal field may be decoded by estimating the sum of all the spatial channels (as if it was sent from just one transmitter), and using the sum to decode the data in the signal field. Therefore, the signal field may be decoded the same way for any type of packet, whether it is a MIMO packet (any number of streams) or a SISO packet.

Figure 10:
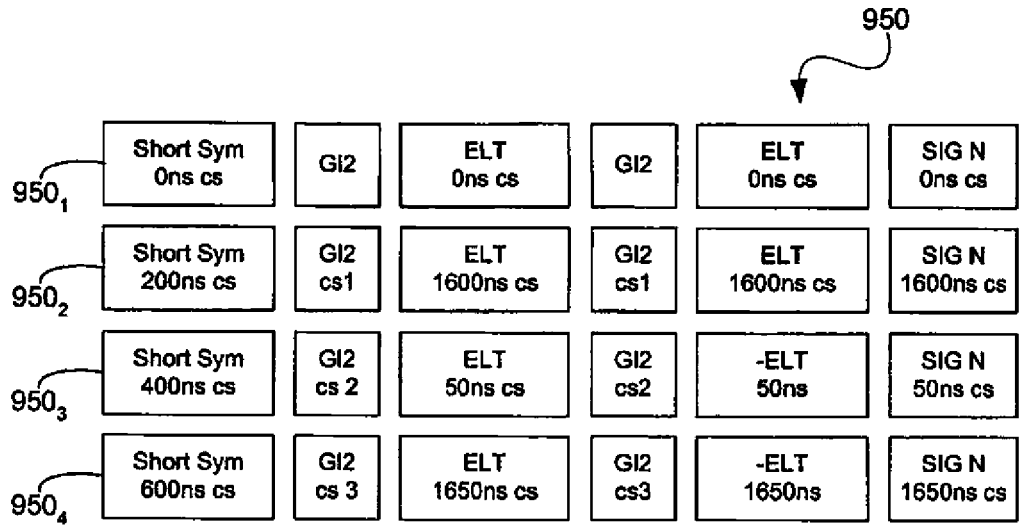
FIG. 10 shows a modified preamble configured for transmission via a system having four transmit antennas, in accordance with another embodiment of the present invention.

FIG. 10 shows a modified preamble 950 adapted for a four-transmit antenna, in accordance with one embodiment of the present invention. Modified preamble 950 includes four preambles 950₁, 950₂, 950₃, and 950₄ that are respectively transmitted from the first, second, third, and fourth transmit antennas (not shown). Each of the preambles 950₁, 950₂, 950₃, and 950₄ includes a short training sequence, a Guard interval, a first ELT sequence, which includes two or more consecutive symbols, a second guard interval, a second ELT sequence, and a signal field. It is understood that for a system with three transmit antenna, preamble 950 includes preambles 950₁, 950₂, 950₃, and for a system with two transmit antennas, preamble 950 includes preambles 950₁, 950₂. Each ELT sequence includes, in turn, two ore more consecutive symbols (collectively referred to as a symbol).

As is shown in FIG. 10, the short training sequences (alternatively referred to herein as short training sequence field) of 950₄, 950₃, and 950₂ have cyclic shifts of 600 nsec, 400 nsec, and 200 nsec, respectively with respect to the short training sequence fields 950₁. The first ELT sequence field of 950₂ has a cyclic shift of 1600 nsec with respect to the first ELT sequence field of 950₁. The first ELT sequence field of 950₃ has a cyclic shift of 50 nsec with respect to the first ELT sequence field of 950₁. The first ELT sequence field of 950₄ has a cyclic shift of 1650 nsec with respect to the first ELT sequence field of 950₁. The second ELT sequence field of 950₂ has a cyclic shift of 1600 nsec with respect to the second ELT sequence field of 950₁. The second ELT sequence field of 950₃ has a cyclic shift of 50 nsec with respect to the second ELT sequence field of 950₁. The second ELT sequence field of 950₄ has a cyclic shift of 1650 nsec with respect to the first ELT sequence field of 950₁. The Signal field of 950₂ has a cyclic shift of 1600 nsec with respect to the signal field of 950₁. The signal field of 950₃ has a cyclic shift of 50 nsec with respect to the signal field of 950₁. The signal field of 950₄ has a cyclic shift of 1650 nsec with respect to the signal field of ELT sequence of 950₁. In the following, the ELT sequence field is alternatively referred to as ELT sequence.

Preamble 950 spreads out the cyclically shifted signals by adding more ELT sequences, thereby enabling the detection of the number of antennas by any one of the ELT sequences that is 6.4 microsecond long. To ensure that the second ELT sequence is independent from the first ELT sequence for each of the transmit antennas, Walsh coding technique may be used (shown by the minus signs added to corresponding ELT sequence symbols of 950₃ and 950₄). Therefore, the frequency orthogonality via cyclic shifting is used to separate TX1 from TX2 and TX3 from TX4, and time orthogonality is used to separate TX1 and TX2 from TX3 and TX4. Therefore, in accordance with the modified preamble, detection of a second ELT sequence transmitted from each antenna is used to distinguish whether the transmit system includes (i) 1 or 2 transmit antennas, (ii) 3 or 4 transmit antennas. The second ELT sequence may be detected, for example, by adding and/or subtracting the two periods and determining if the cross-correlation between the two symbols of the second ELT sequence is high or low. When the cross-correlation is high, a second ELT sequence is detected as being present.

A modified preamble having two ELT sequences for each transmit antennas, as described above, provides a number of other advantages. First, the power drop per transmit stream is relatively small. Second, because the signal field appears at the end of the training sequence for each transmit stream, processing delays due to channel estimation are minimized and thus are more suitable for media access controller (MAC) options. Moreover, the minimum squared estimation (MSE) for channel estimation is the same for systems with two or four transmit antennas.

Figure 11:
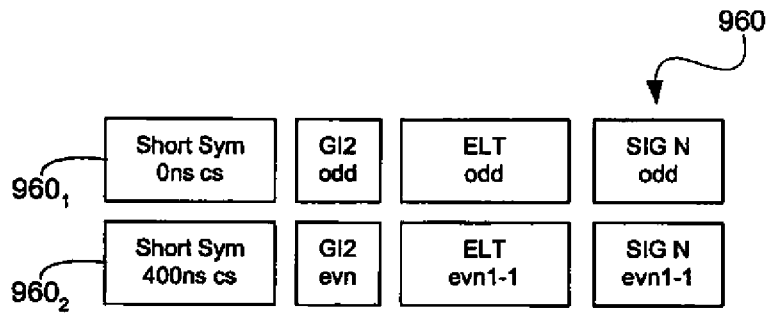
FIG. 11 shows a modified preamble configured for transmission via a system having two transmit antennas, in accordance with another embodiment of the present invention.

FIG. 11 shows a modified preamble 960 configured for transmission via a system having two transmit antennas (not shown), in accordance with another embodiment of the present invention. Preamble part 960₁ of preamble 960 is configured for transmission from the first transmit antenna and preamble part 960₂ of preamble 960 is configured for transmission from the second transmit antenna. Preamble part 960₁ is shown as including a short training sequence (symbols), a guard interval, odd tones of a long training sequence, and a Signal field. Preamble part $960_2$ is shown as including a short training sequence, a guard interval, modified even tones of a long training sequence, and a Signal field. Each of the preamble parts $960_1$ and $960_2$ may or may not be derived from an 802.11a preamble. The signal field of preamble part $960_1$ is shown as including the odd tones of the signal filed of, for example, 802.11a. The signal field of preamble part $960_2$ is shown as including modified even tones of the signal field of, for example an 802.11a preamble. The short training sequence of preamble part $960_2$ has a cyclic shift of 400 nsec with respect to the short training sequence of preamble part $960_1$, but other cyclic shifts may also be used.

The odd training symbols of preamble $960_1$ are formed by multiplying the tones of the long training symbols by the pattern $\{0, 1, 0, 1, 0, 1, 0 \ldots 1\}$, assuming the tone indices are $0, 1, 2, \ldots, N_c-1$, where 0 is assumed to be the DC subcarrier and $N_c$ equals the number of subcarriers. The modified even training symbols and signal field of preamble part $960_2$ are formed by multiplying the even tones of the corresponding long training symbols and signals fields by the pattern $\{1, -1, 1, -1, 1, -1 \ldots\}$, i.e., multiplying the original unmodified tones with the pattern $\{1, 0, -1, 0, 1, 0, -1, 0 \ldots\}$. The tones in preamble parts $960_1$ and $960_2$ are orthogonal. Furthermore the pattern $\{1, -1, 1, -1, 1, -1 \ldots\}$ which is used to generate the modified even tones enables the transmitter to detect that the transmitted preamble, shown in FIG. 11, is not a legacy preamble.

Figure 12:
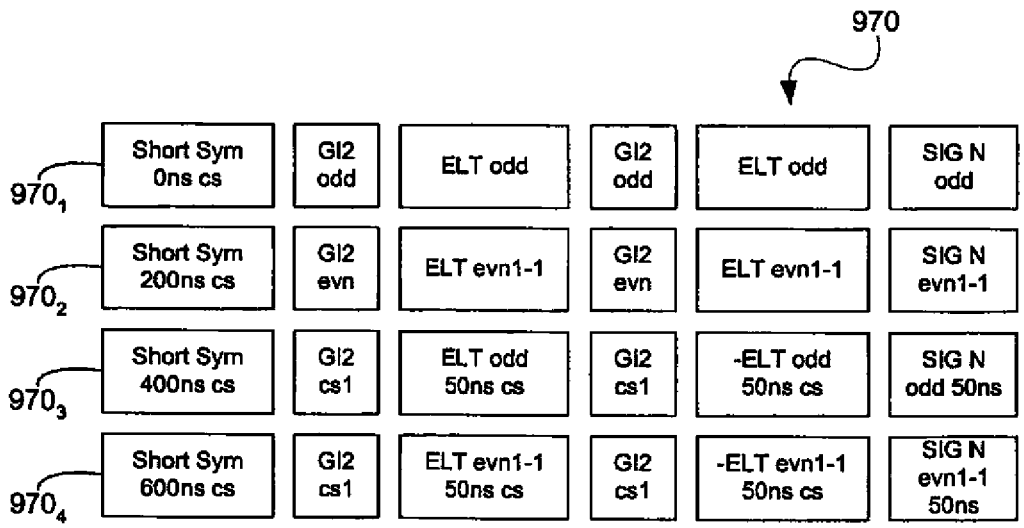
FIG. 12 shows a modified preamble configured for transmission via a system having four transmit antennas, in accordance with another embodiment of the present invention.

FIG. 12 shows a modified preamble 970 configured for transmission via a system having four transmit antennas (not shown), in accordance with another embodiment of the present invention. Preamble 970 includes preamble part $970_1$, $970_2$, $970_3$, and $970_4$, each of which parts include two guard intervals and two extended long training sequences. The short training sequences of preamble parts $970_2$, $970_3$, and $970_4$ have respective cyclic shifts of 200 nsec, 400 nsec, and 600 nsec with respect to the short training sequence of preamble part $970_1$. The guard intervals of preamble part $970_1$ are generated by taking the last part of the time-domain representation of the odd tones of the long training sequence or ELT sequence of preamble part $970_1$, and the guard intervals of preamble part $970_2$ are similarly obtained by taking the last part of the time-domain representation of the long training sequence or ELT sequence of preamble part $970_2$.

Each of the first and second ELT sequences of preamble $970_1$ includes only the odd tones and each of the first and second ELT sequences of preamble $970_2$ includes only the modified even tones, i.e., even tone modified by the pattern $\{1, -1, 1, -1, 1, -1 \ldots\}$. The first and second ELT sequences of preamble $970_3$ include only the odd tones that are cyclically shifted with respect to the corresponding ELT sequence of preamble $970_2$ by 50 nsec. The first and second ELT sequences of preamble $970_4$ include only the modified even tones that are cyclically shifted with respect to the corresponding ELT sequence of preamble $970_3$ by 50 nsec. Moreover, a Walsh code is used such that the first and second ELT sequences of preamble $970_1$ and $970_2$ and the first ELT sequences of preamble $970_3$ and $970_4$ are multiplied by 1, and the second ELT sequences of preamble $970_3$ and $970_4$ are multiplied by -1. This allows for separation between TX1 and TX2 on one side and TX3 and TX4 on the other side. The cyclic shift is used to further the channel training from TX1 and TX2, and TX3 and TX4, respectively.

The signal field of preamble $970_1$ includes only the odd tones, and the signal field of preamble $970_2$ includes only the modified even tones. The signal field of preamble $970_3$ includes only the odd tones and has a cyclic shift of 50 nsec with respect to the signal field of preamble $970_2$. The signal field of preamble $970_4$ includes only the modified even tones and has a cyclic shift of 50 nsec with respect to the signal field of preamble $970_3$.

Figure 13:
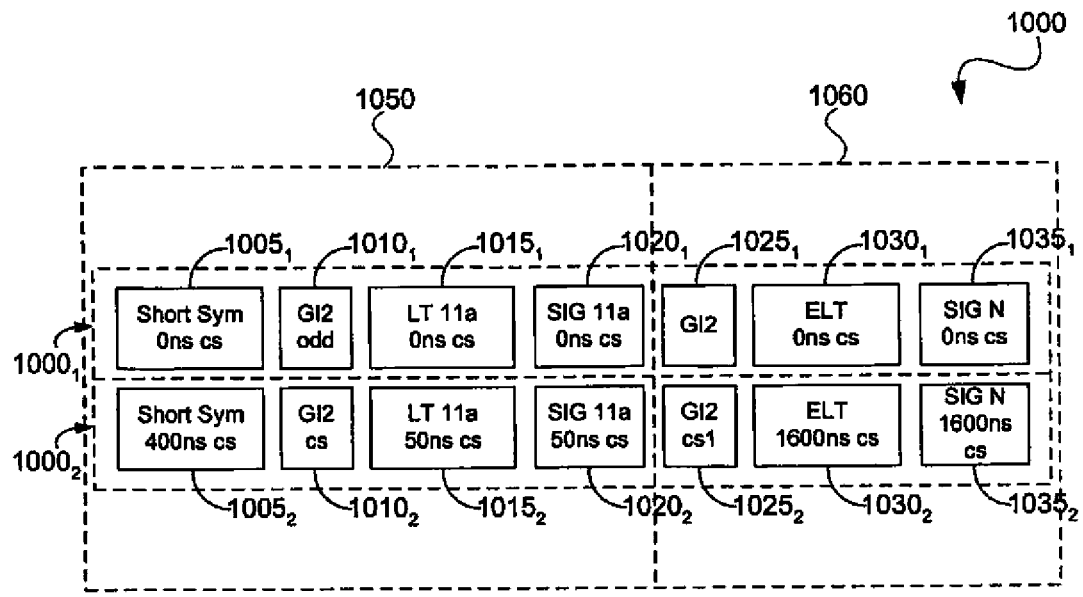
FIG. 13 shows an exemplary mixed-mode preamble configured for transmission via a system with two-transmit antennas, in accordance with one embodiment of the present invention.

In accordance with some embodiments of the present invention, a mixed-mode preamble includes legacy as well as modified preambles. FIG. 13 shows an exemplary mixed-mode preamble 1000 configured for transmission from a system having two-transmit antennas, in accordance with one embodiment of the present invention. Exemplary mixed mode preamble 1000 includes legacy 802.11a/g preamble portion 1050, that may be modified to indicate that an extended training part is appended. e.g., by setting the reserved bit of the legacy signal field, as well as a modified preamble portion 1060, as described above. Mixed mode preamble 1000 includes preamble $1000_1$ that is transmitted from the first antenna and preamble $1000_2$ that is transmitted from the second antenna. Short training sequence $1005_1$, guard interval $1010_1$, long training sequence $1015_1$, and signal field $102_1$ in combination form a legacy 802.11a/g preamble portion of preamble $1000_1$ that is transmitted from the first transmit antenna. Guard interval $1025_1$. ELT sequence $1030_1$, and Signal field $1035_1$ form the modified (extended) preamble portion of $1000_1$. Similarly, short training sequence $1005_2$, guard interval $1010_2$, long training sequence $1015_2$, and signal field $1020_2$ in combination form a legacy 802.11a/g preamble portion of preamble $1000_2$ that is transmitted from the first transmit antenna. Guard interval $1025_2$, ELT sequence $1030_2$, and Signal field $1035_2$ form the extended preamble portion of preamble $1000_2$ that is transmitted from the second antenna.

The various fields of the 802.11a/g preamble portion of preamble $1000_2$ are cyclically shifted with respect to the various fields of the 802.11a/g preamble portion of preamble $1000_1$. Similarly, the various fields of the extended preamble portion of preamble $1000_2$ are cyclically shifted with respect to the various fields of the extended preamble portion of preamble $1000_1$. For example, in the exemplary embodiment shown in FIG. 13, the short training sequence $1005_2$ of the second transmit antenna have a cyclic shift of 400 nsec with respect to the short training sequence $1005_1$ of the first transmit antenna. Similarly, the long training sequence $1015_2$ of the second transmit antenna has a cyclic shift of 50 nsec with respect to the long training sequence $1015_1$ of the first transmit antenna. The Signal field $1020_2$ of the second transmit antenna has a cyclic shift of 50 nsec with respect to the Signal field $1020_1$ of the first transmit antenna. The ELT sequence $1030_2$ of the second transmit antenna has a cyclic shift of 1600 nsec with respect to the ELT sequence $1030_1$ of the first transmit antenna. The Signal field $1035_2$ of the second transmit antenna has a cyclic shift of 1600 nsec with respect to the Signal field $1035_1$ of the first transmit antenna.

The extended preamble portions of preamble $1000_2$ namely those identified by reference numerals $1020_1$, $1025_1$, $1030_1$, $1035_1$ of the first transmit antenna as well as $1020_2$, $1025_2$, $1030_2$, $1035_2$ of the second transmit antenna provide efficient training symbols for many systems, such MIMO OFDM systems. Therefore, when legacy devices as well as extended devices, like MIMO OFDM devices, are also part of the network, both the legacy as well as the extended devices are able to receive and process the preambles.

Through the use of one or more bits of the preamble, (e.g., by setting the reserved bit in the signal field of the legacy portion of the preamble) or by auto-detecting that a second training sequence follows the legacy signal field, extended devices are triggered that enable, for example, channel estimation after the legacy portion of the preamble is received. One advantage of having a modified preamble following a legacy preamble is PHY level backwards compatibility. Hence, no MAC protection mechanisms are needed to communicate at extended rates, leading to enhanced efficiency.

Figure 14:
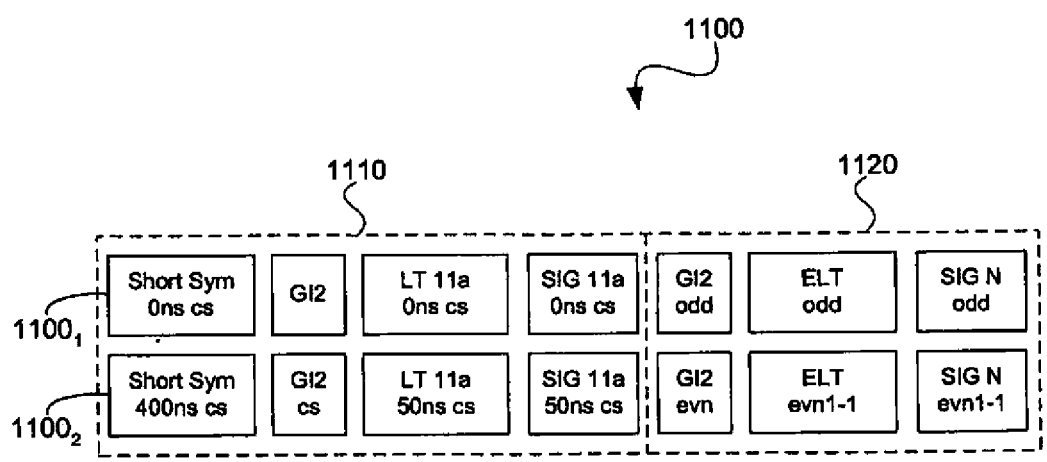
FIG. 14 shows an exemplary mixed-mode preamble configured for transmission from a system having two transmit antennas, in accordance with another embodiment of the present invention.

FIG. 14 shows an exemplary mixed-mode preamble 1100, in accordance with another embodiment of the present invention, configured for transmission from a system having two transmit antennas. Exemplary mixed mode preamble 1100 includes legacy 802.11a/g preamble portion 1110 as well as a modified preamble portion 1120. Legacy 802.11a/g preamble portion 1110 is similar to legacy 802.11a/g preamble portion 1050 of FIG. 13. The guard interval of the preamble portion $1100_1$, configured for transmission from the first transmit antenna, is generated by taking the last part of the time-domain representation of the odd tones of the long training sequence or ELT sequence of preamble $1100_1$, and the guard interval of preamble part $1100_2$ is similarly obtained by taking the last part of the time-domain representation of the long training sequence of $1100_2$. The ELT sequence of preamble portion $1100_1$ only includes the odd tones. The ELT sequence of preamble portion $1100_2$ only includes modified even tones that are generated by multiplying the original unmodified tones by the sequence {1, 0, −1, 0, 1, 0, −1, 0, 1, 0, −1 . . . }. Similarly, the signal field of preamble portion $1100_1$ only includes the odd tones. The signal field of preamble portion $1100_2$ only includes modified even tones that are generated by multiplying the original unmodified tones by the sequence {1, 0, −1, 0, 1, 0, −1, 0 1, 0, −1 . . . } The mixed-mode preamble, in accordance with any of the exemplary embodiments described above, enables the legacy devices to defer to extended devices if they have properly received the legacy part of the mixed-mode preamble.

Figures 15A, 15B:
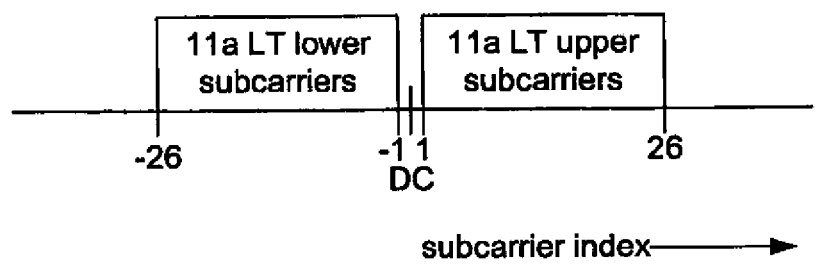
FIG. 15A shows the 64 tones of an extended long training sequence adapted for a 20 MHz channel, in accordance with one embodiment of the present invention.
FIG. 15B shows the lower and upper subcarriers of an 802.11a long training sequence adapted for a 20 MHz channel, as known in the prior art.

FIG. 15A (also shown in FIG. 2 as the sequence L2 except that the DC tone in sequence L2 is disposed at the beginning of the sequence) shows the 64 tones of an ELT sequence 1200 adapted for a 20 MHz channel, in accordance with one embodiment of the present invention. Accordingly, energy is transmitted on every single tone except the DC tone. ELT sequence 1200 includes the tones disposed in the 802.11a long-training sequence, shown in FIG. 15B. ELT sequence 1200 thus carries, next to the 802.11a subcarrier information, on subcarrier indices 27, . . . , 31 the values −1, −1, −1, 1, and on subcarrier indices −32, . . . , −27 the values −1, −1, 1, 1, 1, 1. The various tones of ELT sequence 1200 are selected such that the peak-to-average power of the ELT sequence 1200 is only a few tenths of a dB higher than the peak-to-average power of the 802.11a long training sequence.

Figures 16A, 16B:
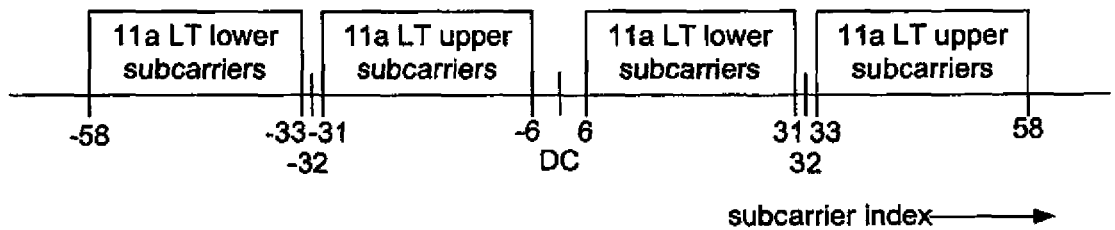
FIG. 16A shows the 128 tones of an extended long training sequence adapted for a 40 MHz channel, as known in the prior art.
FIG. 16B shows the lower and upper subcarriers of an 802.11a long training sequence, adapted for a 40 MHz channel, as known in the prior art.

FIG. 16A (also shown in FIG. 2 as the sequence L4 except that the DC tone in sequence L4 is disposed at the beginning of the sequence) shows the 128 tones of an ELT sequence 1300 adapted for a 40 MHz channel, in accordance with one embodiment of the present invention. Accordingly, energy is transmitted on every single tone except the DC tone. ELT sequence 1400 includes the tones disposed in the 802.11a long-training sequence, shown in FIG. 16B. ELT sequence 1300 carries, next to the two copies of the 802.11a on subcarrier indices −64, . . . , −59 the values −1, −1, 1, 1, 1, 1, on subcarrier index −32 the value −1, on subcarrier indices −5, . . . , −1 the values −1, −1, −1, 1, −1, on subcarrier indices 1, . . . , 5, values −1, 1, 1, 1, 1, on subcarrier index 32 the value −1, and on subcarrer indices 58, . . . , 63 the values −1, −1, −1, 1, −1.

The out-of-band tones (pilots) in each of ELT sequences 1200 and 1300 are attenuated by the transmitter filtering, thus they have relatively small effects on the power of the training sequences, and have relatively minimal effect on the spectral mask. Furthermore, the extended tones are selected such that any inaccuracies due to interpolation is minimized.

Figure 17:
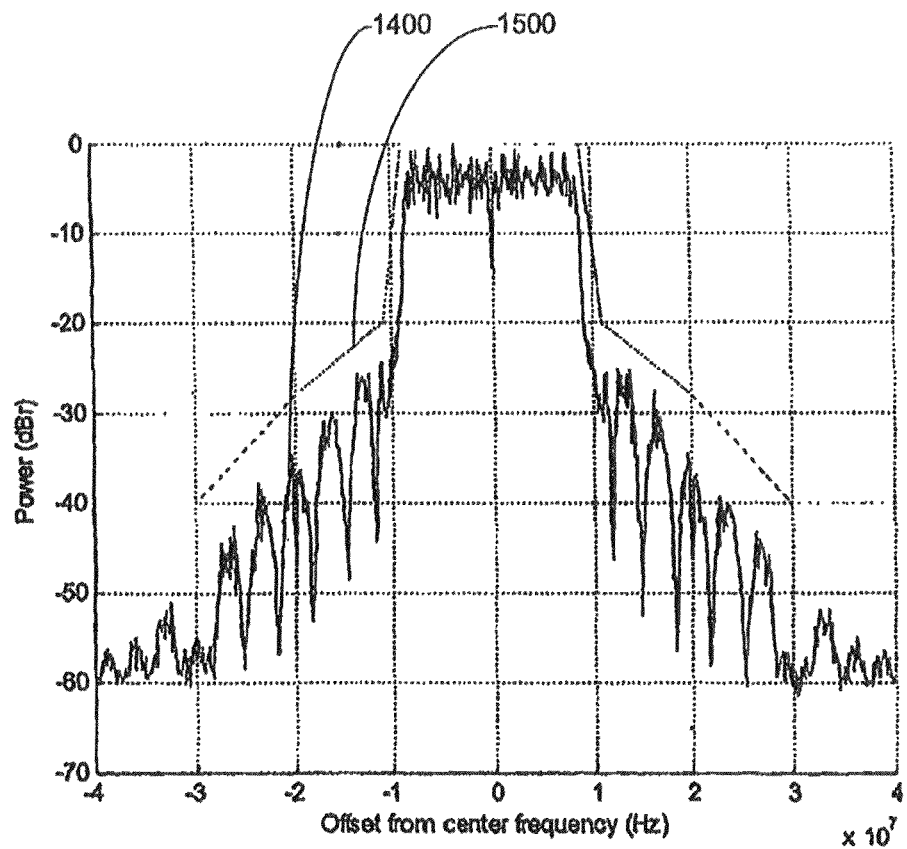
FIG. 17 shows an exemplary spectrum associated with a PHY packet that includes the long training sequence shown in FIG. 15A and disposed within the 802.11a spectral mask defined by 802.11a standard.

Solid line Plot 1400 of FIG. 17, shows the power spectral density as function of the frequency, averaged over the entire packet, associated with the long training sequence 1200, shown in FIG. 15A. The dotted line plot 1500 show the spectral mask as defined in the 802.11a standard. As seen from FIG. 17, the spectrum of sequence 1200 meets the spectral requirements of 802.11a standard.

Figure 18:
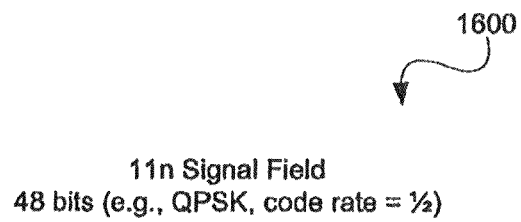
FIG. 18 shows the signal field of a modified preamble, in accordance with one embodiment of the present invention.

FIG. 18 shows a modified signal field 1600, in accordance with one embodiment of the present invention. Signal field 1600 uses a higher constellation density than 802.11a/g. Signal field 1600 uses quadrature phase shift keying (QPSK) instead of binary phase shift keying (BPSK) to maintain the duration of the signal field 4 us (same as 802.11a/g), while carrying twice the data. Signal field 1600 includes 48 bits, of which 6 bits are used to indicate the mode, 16 bits are used to indicate the length, 16 bits are used for CRC for error checking, 1 bit is used to indicate the last PSDU of frame, 3 bits are reserved bits, and 6 bits are set to zero to allow the convolutional encoder as specified in the 802.11a standard to return to the zero state.

Figure 19:
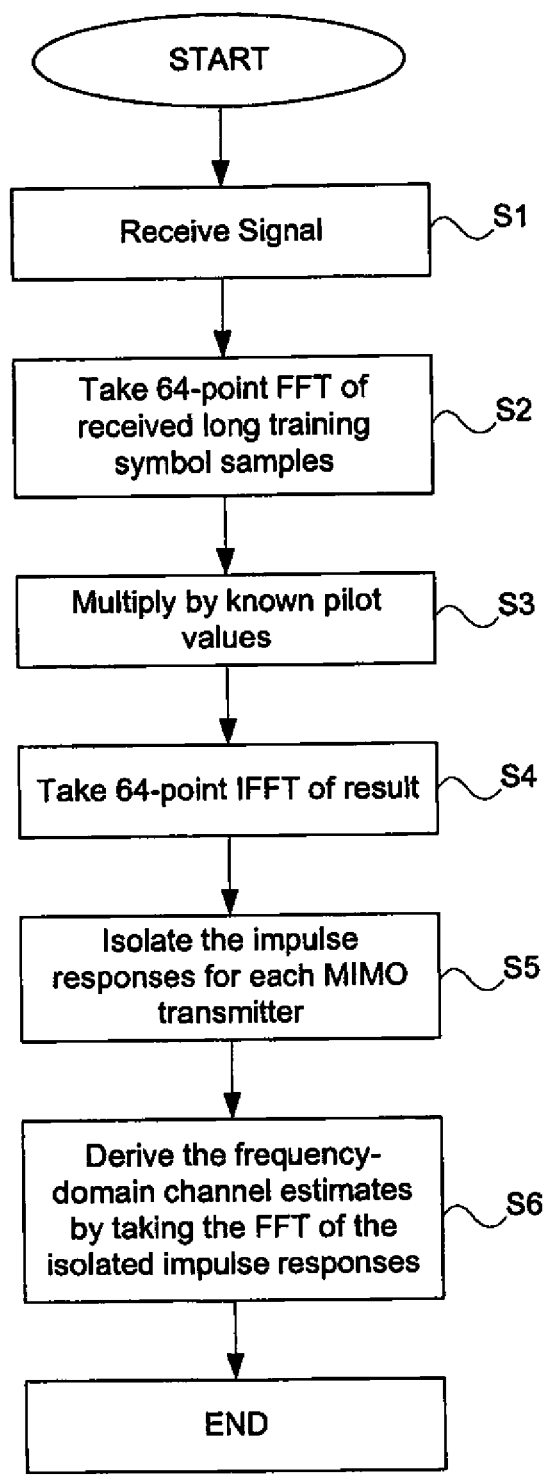
FIG. 19 is a flowchart illustrating one possible process for obtaining channel estimates for each transmitter signal in a MIMO system.

At the receiver side, the channel estimates for each transmitter signal can be estimated by a process such as that shown in FIG. 19. As shown there, the process begins with receiving, signals and sampling for the long training sequence (step S1). Then, a 64-point FFT (or a 128-point FFT for 40 MHz modes, etc.) of the received long training sequence samples is done (step S2), as is done for conventional 802.11a preamble reception. Next, each subcarrier is multiplied by known pilot values (step S3), and an IFFT of the result is taken to get a 64-point, or 128-point, etc. impulse response estimate (step S4).

In the case of a MIMO transmission, for example, the preamble of FIGS. 9A, 9B, 9C in a 20 MHz bandwidth, these 64 samples contain the cyclic shifted impulse responses of all different transmitters. With that, the receiver can isolate the impulse responses for each MIMO transmitter (step S5). For MIMO with two transmit streams, this can be done by separating the first 32 samples and last 32 samples. For four transmit streams, groups of 16 samples can be extracted.

From the extracted impulse responses per transmitter, channel estimates can be derived (step S6) for all subcarriers by taking a 64-point FFT of each impulse response, where the sample values are appended by zero values to get 64 input values.

Signaling Extended Modes

There are several different ways to signal what mode is used:

1) Beaconing: Each access point regularly transmits beacons. By transmitting these beacons using a legacy 802.11a rate on all 20 MHz channels used by the access point, it can be ensured that any device can receive these beacons. The beacon can contain information about which channels are used simultaneously and what extended modes are supported, so each extended device can adjust its mode accordingly.

2) Multiple transmitter detection: If a special long training symbol is used for MIMO transmitters such as the cyclic shifted symbol described herein or other techniques described herein, then these special long training properties can be used to detect whether a packet is a MIMO packet. For instance, if the cyclic shifted long training symbol is used with two MIMO transmitters, the receiver can detect this by checking if the combined impulse response (obtained from step S4 above) contains two distinct impulse responses separated by 32 samples.

3) Signal field: The reserved bit of the Signal field can be used to signal the use of MIMO. It is also possible to extend the Signal field by transmitting an extra symbol. An example of this is shown in Boer. There is a reserved bit in the Signal field that is always zero for 802.11a devices but could be set to 1 to signal MEMO packets. It is also possible to send an extra signal field symbol after the normal 802.11a symbol to signal MIMO rates.

4) Out-of-band pilots: The out-of-band pilots of the long training symbol that are not present in 802.11a can be used to signal different modes. For example, subcarriers 28 through 38 in $L_1$ are zero, but they might be set (as with $L_2$, $L_3$, etc.) to some arbitrary but known values. The receiver can use the presence of these subcarriers as a way to detect MIMO modes and the particular pattern of presence to detect among several modes.

5) Out-of-band subcarriers in the Signal field: Extra subcarriers can be used to signal different extended modes. The use of extra subcarriers has advantages in that a) it does not cost extra preamble overhead, and b) a legacy 802.11a device ignores the out-of-band subcarriers.

The above embodiments of the present invention are illustrative and not limiting. Various alternatives and equivalents are possible. The invention is not limited by the type of encoding, decoding, modulation, demodulation, equalization, filtering, etc., performed. The invention is not limited to the number of transmit or receive antennas. The invention is not limited by the rate used to transfer the data. The invention is not limited by the type of integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A method for transmitting a training sequence, the method comprising:
    transmitting at least first and second preambles configured for transmission from first and second transmit antennas of a wireless communication system, wherein the first preamble comprises:
    a short training sequence field;
    a long training sequence field defined by the odd tones of a legacy long training sequence field;
    a guard interval field generated from time-domain representation of the odd tones of the long training sequence; and
    a signal field defined by the odd tones of a legacy signal field; and
    wherein the second preamble comprises:
    a short training sequence field cyclically shifted with respect to the short training field of the first preamble;
    a long training sequence field defined by the even tones of the legacy long training sequence field;
    a guard interval field generated from time-domain representation of the long training sequence of the second preamble; and
    a signal field defined by the even tones of the legacy signal field.

2. The method of claim 1, wherein the legacy long training sequence field corresponds to a Wi-Fi preamble long training sequence field, and wherein the legacy signal field corresponds to a Wi-Fi preamble signal field.

3. The method of claim 1, wherein the odd tones of a given sequence are generated by multiplying the given sequence by a pattern of alternating 0 and 1 values, and wherein the even tones of a given sequence are generated by multiplying the given sequence by a pattern of alternating 0 and 1 values where every other 1 value has an inverted sign.

4. A method for transmitting a training sequence, the method comprising:
    transmitting first, second, third, and fourth preambles configured for transmission from first, second, third and fourth transmit antennas of a wireless communication system, wherein the first preamble comprises:
    a short training sequence field;
    a first long training sequence field defined by the odd tones of a legacy long training sequence field;
    a second long training sequence defined by the odd tones of the legacy long training sequence field;
    first and second guard interval fields generated from time-domain representation of the odd tones of the first or second long training sequence field; and
    a signal field defined by the odd tones of a legacy signal field;
    wherein the second preamble comprises:
    a short training sequence field having a cyclic shift with respect to the short training sequence field of the first preamble;
    a first long training sequence field defined by the even tones of the legacy long training sequence field;
    a second long training sequence defined by the even tones of the legacy long training sequence field;
    first and second guard interval fields generated from time-domain representation of the first or second long training sequence of the second preamble; and
    a signal field defined by the even tones of the legacy signal field;
    wherein the third preamble comprises:
    a short training sequence field having a cyclic shift with respect to the short training sequence field of the second preamble;
    a first long training sequence field defined by the odd tones of the legacy long training sequence and having a cyclic shift with respect to the first long training sequence of the second preamble;
    a second long training sequence defined by the odd tones of the legacy long training sequence and having a cyclic shift with respect to the second long training sequence of the second preamble; wherein the second long training sequence field of the third preamble has inverted sign with respect to the second long training sequence field of the first preamble;
    first and second guard interval fields defined respectively by cyclic extensions of the first and second long training sequences of the third preamble; and
    a signal field generated from time-domain representation of the odd tones of the first or second long training sequences of the third preamble and having a cyclic shift with respect to the signal field of the second preamble; and
    wherein the fourth preamble comprises:
    a short training sequence field having a cyclic shift with respect to the short training sequence field of the second preamble;
    a first long training sequence field defined by the even tones of the legacy long training sequence field and having a cyclic shift with respect to the first long training sequence field of the third preamble;
    a second long training sequence defined by the even tones of the legacy long training sequence field and having a cyclic shift with respect to the second long training sequence field of the third preamble, wherein the second long training sequence field of the fourth preamble has inverted sign with respect to the second long training sequence field of the first preamble;

first and second guard interval fields defined by a legacy guard interval field; and a signal field generated from time-domain representation of the tones of the first or second long training sequences of the fourth preamble and having a cyclic shift with respect to the signal field of the third preamble.

5. The method of claim 4, wherein the legacy long training sequence field corresponds to a Wi-Fi preamble long training sequence field, wherein the legacy signal field corresponds to a Wi-Fi preamble signal field, and wherein the legacy guard interval field corresponds to a Wi-Fi preamble guard interval field.

6. The method of claim 4, wherein the odd tones of a given sequence are generated by multiplying the given sequence by a pattern of alternating 0 and 1 values, and wherein the even tones of a given sequence are generated by multiplying the given sequence by a pattern of alternating 0 and 1 values where every other 1 value has an inverted sign.

7. A method for transmitting a training sequence, the method comprising:

transmitting at least first and second preambles configured for transmission from at least first and second transmit antennas of a wireless communication system, wherein each of the first and second preambles comprise a first part and a second part, wherein the first part of each of the first and second preambles comprises a legacy preamble, and wherein the second part of the first preamble comprises a long training sequence distinct from legacy long training sequence;

wherein the first part of the second preamble has a cyclic shift with respect to the first part of the first preamble;

wherein the second part of the second preamble comprises a long training sequence distinct from the legacy long training sequence; and wherein the long training sequence of the second preamble has a cyclic shift with respect to the long training sequence of the first preamble.

8. The method of claim 7 wherein the second part of each of the first and second preambles comprises a signal field distinct from a legacy signal field, and wherein the signal field of the second part of the second preamble has a cyclic shift with respect to the signal field of the second part of the first preamble.

9. The method of claim 7 wherein each of the long training sequence of the second part of each of the first and second preambles has a second plurality of tones of which only the DC tone has a zero value.

10. The method of claim 7, wherein the legacy preamble corresponds to a Wi-Fi preamble, and wherein the legacy long training sequence field corresponds to a Wi-Fi preamble long training sequence field.

11. A method for transmitting a training sequence, the method comprising:

transmitting at least first and second preambles configured for transmission from at least first and second transmit antennas of a wireless communication system, wherein each of the first and second preambles comprises a first part and a second part, wherein the first part of each of the first and second preambles comprises a legacy preamble, wherein the first part of the second preamble has a cyclic shift with respect to the first part of the first preamble;

wherein the second part of the first preamble comprises a long training sequence having a plurality of tones defined by the odd tones of a legacy long training sequence, and wherein the second part of the second preamble comprises a long training sequence defined by the even tones of the legacy long training sequence.

12. The method of claim 11, wherein the legacy preamble corresponds to a Wi-Fi preamble, and wherein the legacy long training sequence field corresponds to a Wi-Fi preamble long training sequence field.

13. The method of claim 11, wherein the odd tones of a given sequence are generated by multiplying the given sequence by a pattern of alternating 0 and 1 values, and wherein the even tones of a given sequence are generated by multiplying the given sequence by a pattern of alternating 0 and 1 values where every other 1 value has an inverted sign.

14. A method for transmitting a training sequence, the method comprising:

transmitting at least first and second preambles configured for transmission from at least first and second transmit antennas of a wireless communication system, wherein each of the first and second preambles comprises a first part and a second part, wherein the first part of each of the first and second preambles comprises a legacy preamble, wherein the first part of the second preamble has a cyclic shift with respect to the first part of the first preamble, wherein the second part of the first preamble comprises a signal field having a plurality of tones defined by the odd tones of a legacy signal field, and wherein the second part of the second preamble comprises a signal field having a plurality of tones defined by the even tones of the legacy signal field.

15. The method of claim 14, wherein the legacy preamble corresponds to a Wi-Fi preamble, and wherein the legacy signal field corresponds to a Wi-Fi preamble signal field.

16. The method of claim 14, wherein the odd tones of a given sequence are generated by multiplying the given sequence by a pattern of alternating 0 and 1 values, and wherein the even tones of a given sequence are generated by multiplying the given sequence by a pattern of alternating 0 and 1 values where every other 1 value has an inverted sign.

17. An apparatus comprising:

a processor operative to generate a training sequence comprising at least first and second preambles configured for transmission from first and second transmit antennas of a wireless communication system, wherein the first preamble comprises:

a short training sequence field;

a long training sequence field defined by the odd tones of a legacy long training sequence field;

a guard interval field generated from time-domain representation of the odd tones of the legacy long training sequence; and a signal field defined by the odd tones of a legacy signal field; and wherein the second preamble comprises:

a short training sequence field being cyclically shifted with respect to the short training field of the first preamble;

a long training sequence field defined by the even tones of the legacy long training sequence field;

a guard interval field generated from time-domain representation of the long training sequence of the second preamble; and a signal field defined by the even tones of the legacy signal field.

18. An apparatus comprising:
a processor operative to generate a training sequence comprising first, second, third, and fourth preambles configured for transmission from first, second, third and fourth transmit antennas of a wireless communication system, wherein the first preamble comprises:
a short training sequence field;
a first long training sequence field defined by the odd tones of a legacy long training sequence field;
a second long training sequence defined by the odd tones of the legacy long training sequence field;
first and second guard interval fields generated from time-domain representation of the odd tones of the first or second long training sequence field; and
a signal field defined by the odd tones of a legacy signal field;
wherein the second preamble comprises:
a short training sequence field having a cyclic shift with respect to the short training sequence field of the first preamble;
a first long training sequence field defined by the even tones of the legacy long training sequence field;
a second long training sequence defined by the even tones of the legacy long training sequence field;
first and second guard interval fields generated from time-domain representation of the first or second long training sequence of the second preamble; and
a signal field defined by the even tones of the legacy signal field;
wherein the third preamble comprises:
a short training sequence field having a cyclic shift with respect to the short training sequence field of the second preamble;
a first long training sequence field defined by the odd tones of the legacy long training sequence and having a cyclic shift with respect to the first long training sequence of the second preamble;
a second long training sequence defined by the odd tones of the legacy long training sequence and having a cyclic shift with respect to the second long training sequence of the second preamble; wherein the second long training sequence field of the third preamble has inverted sign with respect to the second long training sequence field of the first preamble;
first and second guard interval fields defined respectively by cyclic extensions of the first and second long training sequences of the third preamble; and
a signal field generated from time-domain representation of the odd tones of the first or second long training sequences of the third preamble and having a cyclic shift with respect to the signal field of the second preamble; and
wherein the fourth preamble comprises:
a short training sequence field having a cyclic shift with respect to the short training sequence field of the second preamble;
a first long training sequence field defined by the even tones of the legacy long training sequence field and having a cyclic shift with respect to the first long training sequence field of the third preamble;
a second long training sequence defined by the even tones of the legacy long training sequence field and having a cyclic shift with respect to the second long training sequence field of the third preamble, wherein the second long training sequence field of the fourth preamble has inverted sign with respect to the second long training sequence field of the first preamble;
first and second guard interval fields defined by a legacy guard interval field; and
a signal field generated from time-domain representation of the tones of the first or second long training sequences of the fourth preamble and having a cyclic shift with respect to the signal field of the third preamble.

19. An apparatus comprising:
a processor operative to generate a training sequence comprising at least first and second preambles configured for transmission from at least first and second transmit antennas of a wireless communication system,
wherein each of the first and second preambles comprise a first part and a second part,
wherein the first part of each of the first and second preambles comprises a legacy preamble, and
wherein the second part of the first preamble comprises a long training sequence distinct from a legacy long training sequence;
wherein the first part of the second preamble has a cyclic shift with respect to the first part of the first preamble;
wherein the second part of the second preamble comprises a long training sequence distinct from the legacy long training sequence; and
wherein the long training sequence of the second preamble has a cyclic shift with respect to the long training sequence of the first preamble.

20. The apparatus of claim 19 wherein the second part of each of the first and second preambles comprises a signal field distinct from a legacy signal field, and
wherein the signal field of the second part of the second preamble has a cyclic shift with respect to the signal field of the second part of the first preamble.

21. The apparatus of claim 19 wherein each of the long training sequence of the second part of each of the first and second preambles has a second plurality of tones of which only the DC tone has a zero value.

22. An apparatus comprising:
a processor operative to generate a training sequence comprising at least first and second preambles configured for transmission from at least first and second transmit antennas of a wireless communication system,
wherein each of the first and second preambles comprises a first part and a second part,
wherein the first part of each of the first and second preambles comprises a legacy preamble,
wherein the first part of the second preamble has a cyclic shift with respect to the first part of the first preamble;
wherein the second part of the first preamble comprises a long training sequence having a plurality of tones defined by the odd tones of a legacy long training sequence, and
wherein the second part of the second preamble comprises a long training sequence defined by the even tones of the legacy long training sequence.

23. An apparatus comprising:
a processor operative to generate a training sequence comprising at least first and second preambles configured for transmission from at least first and second transmit antennas of a wireless communication system,
wherein each of the first and second preambles comprises a first part and a second part,
wherein the first part of each of the first and second preambles comprises a legacy preamble,
wherein the first part of the second preamble has a cyclic shift with respect to the first part of the first preamble, wherein the second part of the first preamble comprises a signal field having a plurality of tones defined by the odd tones of a legacy signal field, and wherein the second part of the second preamble comprises a signal field having a plurality of tones defined by the even tones of the legacy signal field.

24. A wireless communications device comprising:

a plurality of transmit antennas; and means for generating a training sequence comprising at least first and second preambles configured for transmission from first and second transmit antennas of a wireless communication system, wherein the first preamble comprises:

a short training sequence field;

a long training sequence field defined by the odd tones of a legacy long training sequence field;

a guard interval field generated from time-domain representation of the odd tones of the legacy long training sequence; and a signal field defined by the odd tones of a legacy signal field; and wherein the second preamble comprises:

a short training sequence field cyclically shifted with respect to the short training field of the first preamble;

a long training sequence field defined by the even tones of the legacy long training sequence field;

a guard interval field generated from time-domain representation of the long training sequence of the second preamble; and a signal field defined by the even tones of the legacy signal field.

25. A wireless communications device comprising:

a plurality of transmit antennas; and means for generating a training sequence comprising first, second, third, and fourth preambles configured for transmission from first, second, third and fourth transmit antennas of a wireless communication system, wherein the first preamble comprises:

a short training sequence field;

a first long training sequence field defined by the odd tones of a legacy long training sequence field;

a second long training sequence defined by the odd tones of the legacy long training sequence field;

first and second guard interval fields generated from time-domain representation of the odd tones of the first or second long training sequence field; and a signal field defined by the odd tones of a legacy signal field;

wherein the second preamble comprises:

a short training sequence field having a cyclic shift with respect to the short training sequence field of the first preamble;

a first long training sequence field defined by the even tones of the legacy long training sequence field;

a second long training sequence defined by the even tones of the legacy long training sequence field;

first and second guard interval fields generated from time-domain representation of the first or second long training sequence of the second preamble; and a signal field defined by the even tones of the legacy signal field;

wherein the third preamble comprises:

a short training sequence field having a cyclic shift with respect to the short training sequence field of the second preamble;

a first long training sequence field defined by the odd tones of the legacy long training sequence and having a cyclic shift with respect to the first long training sequence of the second preamble;

a second long training sequence defined by the odd tones of the legacy long training sequence and having a cyclic shift with respect to the second long training sequence of the second preamble; wherein the second long training sequence field of the third preamble has inverted sign with respect to the second long training sequence field of the first preamble;

first and second guard interval fields defined respectively by cyclic extensions of the first and second long training sequences of the third preamble; and a signal field generated from time-domain representation of the odd tones of the first or second long training sequences of the third preamble and having a cyclic shift with respect to the signal field of the second preamble; and wherein the fourth preamble comprises:

a short training sequence field having a cyclic shift with respect to the short training sequence field of the second preamble;

a first long training sequence field defined by the even tones of the legacy long training sequence field and having a cyclic shift with respect to the first long training sequence field of the third preamble;

a second long training sequence defined by the even tones of the legacy long training sequence field and having a cyclic shift with respect to the second long training sequence field of the third preamble, wherein the second long training sequence field of the fourth preamble has inverted sign with respect to the second long training sequence field of the first preamble;

first and second guard interval fields defined by a legacy guard interval field; and a signal field generated from time-domain representation of the tones of the first or second long training sequences of the fourth preamble and having a cyclic shift with respect to the signal field of the third preamble.

26. A wireless communications device comprising:

a plurality of transmit antennas; and means for generating a training sequence comprising at least first and second preambles configured for transmission from at least first and second transmit antennas of a wireless communication system, wherein each of the first and second preambles comprise a first part and a second part, wherein the first part of each of the first and second preambles comprises a legacy preamble, and wherein the second part of the first preamble comprises a long training sequence distinct from a legacy long training sequence;

wherein the first part of the second preamble has a cyclic shift with respect to the first part of the first preamble;

wherein the second part of the second preamble comprises a long training sequence distinct from the legacy long training sequence; and wherein the long training sequence of the second preamble has a cyclic shift with respect to the long training sequence of the first preamble.

27. The wireless communications device of claim 26 wherein the second part of each of the first and second preambles comprises a signal field distinct from a legacy signal field, and wherein the signal field of the second part of the second preamble has a cyclic shift with respect to the signal field of the second part of the first preamble.

28. The wireless communications device of claim 26 wherein each of the long training sequence of the second part of each of the first and second preambles has a second plurality of tones of which only the DC tone has a zero value.

29. A wireless communications device comprising:
a plurality of transmit antennas; and
means for generating a training sequence comprising at least first and second preambles configured for transmission from at least first and second transmit antennas of a wireless communication system,
wherein each of the first and second preambles comprises a first part and a second part,
wherein the first part of each of the first and second preambles comprises a legacy preamble,
wherein the first part of the second preamble has a cyclic shift with respect to the first part of the first preamble;
wherein the second part of the first preamble comprises a long training sequence having a plurality of tones defined by the odd tones of a legacy long training sequence, and
wherein the second part of the second preamble comprises a long training sequence defined by the even tones of the legacy long training sequence.

30. A wireless communications device comprising:
a plurality of transmit antennas; and
means for generating a training sequence comprising at least first and second preambles configured for transmission from at least first and second transmit antennas of a wireless communication system,
wherein each of the first and second preambles comprises a first part and a second part,
wherein the first part of each of the first and second preambles comprises a legacy preamble,
wherein the first part of the second preamble has a cyclic shift with respect to the first part of the first preamble,
wherein the second part of the first preamble comprises a signal field having a plurality of tones defined by the odd tones of a legacy signal field, and
wherein the second part of the second preamble comprises a signal field having a plurality of tones defined by the even tones of the legacy signal field.

31. A computer program product residing on a processor-readable medium and comprising processor-readable instructions configured to cause a processor to:
transmit at least first and second preambles configured for transmission from first and second transmit antennas of a wireless communication system, wherein the first preamble comprises:
a short training sequence field;
a long training sequence field defined by the odd tones of a legacy long training sequence field;
a guard interval field generated from time-domain representation of the odd tones of the legacy long training sequence; and
a signal field defined by the odd tones of a legacy signal field; and
wherein the second preamble comprises:
a short training sequence field cyclically shifted with respect to the short training field of the first preamble;
a long training sequence field defined by the even tones of the legacy long training sequence field;
a guard interval field generated from time-domain representation of the long training sequence of the second preamble; and
a signal field defined by the even tones of the legacy signal field.

32. A computer program product residing on a processor-readable medium and comprising processor-readable instructions configured to cause a processor to:
transmit first, second, third, and fourth preambles configured for transmission from first, second, third and fourth transmit antennas of a wireless communication system, wherein the first preamble comprises:
a short training sequence field;
a first long training sequence field defined by the odd tones of a legacy long training sequence field;
a second long training sequence defined by the odd tones of the legacy long training sequence field;
first and second guard interval fields generated from time-domain representation of the odd tones of the first or second long training sequence field; and
a signal field defined by the odd tones of a legacy signal field;
wherein the second preamble comprises:
a short training sequence field having a cyclic shift with respect to the short training sequence field of the first preamble;
a first long training sequence field defined by the even tones of the legacy long training sequence field;
a second long training sequence defined by the even tones of the legacy long training sequence field;
first and second guard interval fields generated from time-domain representation of the first or second long training sequence of the second preamble; and
a signal field defined by the even tones of the legacy signal field;
wherein the third preamble comprises:
a short training sequence field having a cyclic shift with respect to the short training sequence field of the second preamble;
a first long training sequence field defined by the odd tones of the legacy long training sequence and having a cyclic shift with respect to the first long training sequence of the second preamble;
a second long training sequence defined by the odd tones of the legacy long training sequence and having a cyclic shift with respect to the second long training sequence of the second preamble; wherein the second long training sequence field of the third preamble has inverted sign with respect to the second long training sequence field of the first preamble;
first and second guard interval fields defined respectively by cyclic extensions of the first and second long training sequences of the third preamble; and
a signal field generated from time-domain representation of the odd tones of the first or second long training sequences of the third preamble and having a cyclic shift with respect to the signal field of the second preamble; and
wherein the fourth preamble comprises:
a short training sequence field having a cyclic shift with respect to the short training sequence field of the second preamble;
a first long training sequence field defined by the even tones of the legacy long training sequence field and having a cyclic shift with respect to the first long training sequence field of the third preamble;
a second long training sequence defined by the even tones of the legacy long training sequence field and having a cyclic shift with respect to the second long training sequence field of the third preamble, wherein the second long training sequence field of the fourth preamble has inverted sign with respect to the second long training sequence field of the first preamble;

first and second guard interval fields defined by a legacy guard interval field; and a signal field generated from time-domain representation of the tones of the first or second long training sequences of the fourth preamble and having a cyclic shift with respect to the signal field of the third preamble.

33. A computer program product residing on a processor-readable medium and comprising processor-readable instructions configured to cause a processor to:

transmit at least first and second preambles configured for transmission from at least first and second transmit antennas of a wireless communication system, wherein each of the first and second preambles comprise a first part and a second part, wherein the first part of each of the first and second preambles comprises a legacy preamble, and wherein the second part of the first preamble comprises a long training sequence distinct from a legacy long training sequence;

wherein the first part of the second preamble has a cyclic shift with respect to the first part of the first preamble;

wherein the second part of the second preamble comprises a long training sequence distinct from the legacy long training sequence; and wherein the long training sequence of the second preamble has a cyclic shift with respect to the long training sequence of the first preamble.

34. The computer program product of claim 33 wherein the second part of each of the first and second preambles comprises a signal field distinct from a legacy signal field, and wherein the signal field of the second part of the second preamble has a cyclic shift with respect to the signal field of the second part of the first preamble.

35. The computer program product of claim 33 wherein each of the long training sequence of the second part of each of the first and second preambles has a second plurality of tones of which only the DC tone has a zero value.

36. A computer program product residing on a processor-readable medium and comprising processor-readable instructions configured to cause a processor to:

transmit at least first and second preambles configured for transmission from at least first and second transmit antennas of a wireless communication system, wherein each of the first and second preambles comprises a first part and a second part, wherein the first part of each of the first and second preambles comprises a legacy preamble, wherein the first part of the second preamble has a cyclic shift with respect to the first part of the first preamble;

wherein the second part of the first preamble comprises a long training sequence having a plurality of tones defined by the odd tones of a legacy long training sequence, and wherein the second part of the second preamble comprises a long training sequence defined by the even tones of the legacy long training sequence.

37. A computer program product residing on a processor-readable medium and comprising processor-readable instructions configured to cause a processor to:

transmit at least first and second preambles configured for transmission from at least first and second transmit antennas of a wireless communication system, wherein each of the first and second preambles comprises a first part and a second part, wherein the first part of each of the first and second preambles comprises a legacy preamble, wherein the first part of the second preamble has a cyclic shift with respect to the first part of the first preamble, wherein the second part of the first preamble comprises a signal field having a plurality of tones defined by the odd tones of a legacy signal field, and wherein the second part of the second preamble comprises a signal field having a plurality of tones defined by the even tones of the legacy signal field.

* * * * *